(12) United States Patent
Kim

(10) Patent No.: US 7,076,454 B2
(45) Date of Patent: Jul. 11, 2006

(54) METHOD AND SYSTEM FOR ELECTRONIC COMMERCE USING PRODUCTS SATISFACTION INDEX

(76) Inventor: Jong-Seong Kim, 446-18 Sadang-dong, Dongjak-gu, Seoul 156-090 (KR)

( * ) Notice: Subject to any disclaimer, the term of this patent is extended or adjusted under 35 U.S.C. 154(b) by 234 days.

(21) Appl. No.: 10/652,047

(22) Filed: Aug. 29, 2003

(65) Prior Publication Data

US 2004/0039598 A1 Feb. 26, 2004

Related U.S. Application Data

(63) Continuation of application No. PCT/KR02/00395, filed on Mar. 7, 2002.

(30) Foreign Application Priority Data

| Mar. 7, 2001 | (KR) | ................. | 10-2001-0011593 |
| Dec. 29, 2001 | (KR) | ................. | 10-2001-0088497 |

(51) Int. Cl.
*G06Q 30/00* (2006.01)

(52) U.S. Cl. ........................................... 705/26

(58) Field of Classification Search .................. 705/7, 705/26, 27, 10, 37
See application file for complete search history.

(56) References Cited

U.S. PATENT DOCUMENTS

| 5,535,382 | A | * | 7/1996 | Ogawa ........................... 707/5 |
| 5,544,049 | A | * | 8/1996 | Henderson et al. ............ 707/3 |
| 5,754,850 | A | * | 5/1998 | Janssen ........................ 705/26 |
| 6,012,053 | A | * | 1/2000 | Pant et al. ..................... 707/3 |
| 6,115,691 | A | * | 9/2000 | Ulwick ......................... 705/10 |
| 6,236,991 | B1 | * | 5/2001 | Frauenhofer et al. ......... 705/10 |
| 6,370,513 | B1 | * | 4/2002 | Kolawa et al. ............... 705/10 |
| 6,873,967 | B1 | * | 3/2005 | Kalagnanam et al. ......... 705/26 |

FOREIGN PATENT DOCUMENTS

| KR | 2000-0054157 | 9/2000 |
| KR | 2000-0064077 | 11/2000 |
| KR | 2001-0008242 | 2/2001 |
| WO | WO-00/65505 A2 | * 11/2000 |
| WO | WO-01/75736 A1 | * 10/2001 |

OTHER PUBLICATIONS

Malone, The logic of electronic markets, May/Jun. 1989, Harvard Business Review, v.67, n.3, p. 166 (4 pages).*
Strom, Building your online storefront, Feb. 2, 1998, InfoWorld, v.20, n.5, p. 45 (2 pages).*
Bakos, A strategic analysis of electronic marketplaces, Sep. 1991, MIS Quarterly, v. 15, n.3, p. 295 (16 pages).*

* cited by examiner

*Primary Examiner*—Tamara L. Graysay
(74) *Attorney, Agent, or Firm*—St. Onge Steward Johnston & Reens LLC

(57) ABSTRACT

Disclosed is an electronic commerce method in which a seller and a purchaser who are members access via Internet to a management server and undergo member authentication. The management server receives sales products information from the seller and stores the products information, receives products names and prices conditions from the purchaser, first retrieves purchase products, receives various purchasing conditions on the first retrieved products, secondly retrieves products, compares the product information inputted by the seller with the purchasing conditions, computes satisfaction on the products and purchase satisfaction prices from the product satisfaction, receives number on the product satisfaction, thirdly retrieves purchase products from the secondly retrieved products, finally retrieves products from the thirdly retrieved products depending on priorities of the purchasing conditions, compares the computed purchase satisfaction prices of the finally retrieved products with minimum sale allowance prices of the seller, and recognizes the purchase by determining the comparing result.

16 Claims, 19 Drawing Sheets

FIG. 11A

| Request of product information registration | |
|---|---|
| Purchaser ID | kmix (display as up to eight characters except special character) |
| Product name | shirt     brand     KJS |
| Model No | C5896     quantity of sales     10 suit |
| Product image | file name of image     C:\data\shirts.jpg |
| Selling price | 53,000 won |
| Sales approvable price according to products satisfaction index | input in table 1 |
| size | |
| Product set | yes⊙ no◎ no relation◎ |
| Construction of set | products of same kind⊙ suit◎ trousers◎ skirt◎ jumper◎ jacket◎ overcoat◎ cardigan⊙ vest◎ knit◎ tie⊙ the others◎ no relation◎ |
| Sex of user | male⊙ female◎ ambisextrous◎     age of user     18 to 50 years old |
| marriage of user | unmarried⊙ married◎ no relation◎ |
| body type of use | big and plump◎ big and lean◎ small and plump◎ small and lean◎ no relation⊙ |
| occupation of user | student◎ employee⊙ housewife◎ ⋯⋯the others◎ |
| usage | business⊙ sports/leisure◎ ordinary dress◎ travel◎ party◎ condolence◎ the others◎ no relation◎ |
| origin | domestic production⊙ foreign production◎ no relation◎ |
| brand perception | high⊙ normal◎ low◎ no relation◎ |
| kind of production | self-production◎ custom production(domestic)⊙ custom production(foreign)◎ the others no relation◎ |
| producing method | handmade◎ automatic production⊙ combined product◎ the others◎ no relation◎ |
| using season | all the year round◎ spring◎ summer◎ autumn◎ winter◎ spring/summer◎ spring/autumn◎ spring/winter◎ summer/autumn◎ summer/winter◎ autumn/winter⊙ the others◎ no relation◎ |
| year of production | up-to-date⊙ less than 3 months◎ less than 6 months◎ less than one year◎ more than one year◎ the others◎ no relation◎ |
| product material | wool◎ cotton◎ flax◎ silk◎ leather◎ mixed spinning⊙ velvet◎ corduroy denim(jean)◎ chemical fiber◎ rayon◎ the others◎ no relation◎ |
| color | yes⊙ no◎ no relation◎ |
| hue | white series⊙ beige series◎ yellow series◎ red series◎ green series◎ blue series⊙ violet series◎ brown series◎ gray series◎ black series⊙ mixed◎ the others◎ no relation◎ |
| brightness | bright◎ average◎ dark◎ no relation⊙ |
| chroma | thin◎ average◎ deep◎ no relation⊙ |
| design | no? check◎ stripe⊙ spot/drop◎ the others◎ no relation◎ |
| shape of neck | round◎ normal◎ V shape⊙ long neck◎ the others◎ no relation◎ |
| style of sleeve | sleeveless◎ half sleeve◎ long sleeve⊙ no relation◎ |
| waist line | yes⊙ no◎ no relation◎ |
| pleats | yes⊙ no◎ no relation◎ |
| pocket | yes◎ no⊙ no relation◎ |
| wrinkle-free | good⊙ normal◎ bad◎ no relation◎ |
| sweat absorption | good⊙ normal◎ bad◎ no relation◎ |
| settlement method | credit card◎ electronic money◎ on-line depositing◎ the others◎ everything◎ no relation⊙ |
| delivery date | prompt◎ one or two days◎ three or four days◎ more than 5 days◎ the others◎ no relation⊙ |
| delivery region | Seoul◎ Kyung-gi◎ Kang-won◎ ⋯⋯nationwide⊙ |
| life | 5 year     term of guaranty 1 year     closing time of purchase 2001 year 01 month 31 day |
| predominant item | quality⊙ design◎ price◎ function/effect◎ brand◎ the others◎ |
| other product description | input special items for custom satisfaction |
| registration data of produc | 2001 year 12 month 14 day |

Register     Correct     Cancel

FIG. 11B

| Products satisfaction index | reducing rate | Minimum sale allowance price |
|---|---|---|
| 96-100 | 4.0% | 50,880 |
| 91-95 | 4.5% | 50,615 |
| 86-90 | 5.0% | 50,350 |
| 81-85 | 5.5% | 50,085 |
| 76-80 | 6.0% | 49,820 |
| 71-75 | 6.5% | 49,555 |
| up to 70 | 7.0% | 49,290 |

FIG. 12A

| \multicolumn{2}{c}{Basic purchasing condition input sheet} | |
|---|---|
| Product name | shirt |
| set | no want◎ want⊙ no relation◎ |
| prince range | 40,000 won from  60,000 won to |
| quantity of purchase | 1 suit |
| user | the subject◎ the others⊙ no relation◎ |
| sex of user | male⊙ female◎ ambisextrous◎   age of user  20 to 25 years old |
| marriage of user | unmarried⊙ married◎ no relation◎ |
| body type of use | big and plump◎ big and lean⊙ small and plump◎ small and lean◎ no relation◎ |
| occupation of user | student◎ employee⊙ housewife◎ ····the others◎ |
| usage | business⊙ sports/leisure◎ ordinary dress◎ travel◎ party◎ condolence◎ the others◎ no relation◎ |
| predominant item | quality⊙ design◎ price◎ function/effect◎ brand◎ the others◎ no relation◎ |

[general retrieve]   [detailed retrieve]

FIG. 12B

| \multicolumn{2}{c}{products information} | |
|---|---|
| hue | beige, red, green, gray |
| brightness | bright |
| chroma | thin |
| design | no, stripe |
| shape of neck | V shape |
| purchasing condition | want    no want |

FIG. 12C

| Detailed purchasing conditions input sheet ||
|---|---|
| origin | domestic production⊙ foreign production◎ no relation◎ |
| brand perception | high⊙ normal◎ low◎ no relation◎ |
| kind of production | self-production⊙ custom production(domestic)◎ custom production(foreign)◎ the others no relation◎ |
| producing method | handmade◎ automatic production⊙ combined product◎ the others◎ no relation◎ |
| Construction of set | products of same kind⊙ suit◎ trousers⊙ skirt◎ jumper◎ jacket◎ overcoat◎ cardigan⊙ vest◎ knit◎ tie⊙ the others◎ no relation◎ |
| using season | all the year round◎ spring◎ summer◎ autumn◎ winter◎ spring/summer◎ spring/autumn◎ spring/winter◎ summer/autumn◎ summer/winter◎ autumn/winter⊙ the others◎ no relation◎ |
| year of production | up-to-date⊙ less than 3 months◎ less than 6 months◎ less than one year◎ more than one year◎ the others◎ no relation◎ |
| product material | wool◎ cotton⊙ flax◎ silk◎ leather◎ mixed spinning◎ velvet◎ corduroy denim(jean)◎ chemical fiber◎ rayon◎ the others◎ no relation◎ |
| color | yes⊙ no◎ no relation◎ |
| hue | white series◎ beige series⊙ yellow series◎ red series◎ green series◎ blue series◎ violet series◎ brown series◎ gray series◎ black series◎ mixed◎ the others◎ no relation◎ |
| brightness | bright⊙ average◎ dark◎ no relation◎ |
| chroma | thin⊙ average◎ deep◎ no relation◎ |
| design | no⊙ check◎ stripe◎ spot/drop◎ the others◎ no relation◎ |
| shape of neck | round◎ normal◎ V shape⊙ long neck◎ the others◎ no relation◎ |
| style of sleeve | sleeveless◎ half sleeve◎ long sleeve⊙ no relation◎ |
| waist line | yes⊙ no◎ no relation◎ |
| pleats | yes⊙ no◎ no relation◎ |
| pocket | yes⊙ no◎ no relation◎ |
| wrinkle-free | good⊙ normal◎ bad◎ no relation◎ |
| sweat absorption | good⊙ normal◎ bad◎ no relation◎ |
| settlement method | credit card⊙ electronic money◎ on-line depositing◎ the others◎ everything◎ no relation◎ |
| delivery date | prompt◎ one or two days◎ three or four days⊙ more than 5 days the others◎ no relation◎ |
| delivery region | Seoul⊙ Kyung-gi◎ Kang-won◎ ····nationwide◎ |

[ confirm ]  [ Correct ]  [ Cancel ]

FIG. 13

| No. | purchasing condition items | Product selection criteria/predominant item ||||| 
|---|---|---|---|---|---|---|
| | | quality | design | price | function/effect | brand |
| 1 | set | | | 0 | 0 | |
| 2 | price | 0 | 0 | 0 | 0 | 0 |
| 3 | sex of user | | 0 | | 0 | |
| 4 | age of user(class) | | 0 | | 0 | |
| 5 | marriage of user | | 0 | 0 | | 0 |
| 6 | body type of user | | 0 | | 0 | |
| 7 | occupation of user | | 0 | 0 | 0 | 0 |
| 8 | usage | | 0 | 0 | 0 | |
| 9 | origin | 0 | | | | 0 |
| 10 | brand perception | | | 0 | | 0 |
| 11 | kind of production | | | 0 | | 0 |
| 12 | producing method | | 0 | 0 | | 0 |
| 13 | construction of set | | | 0 | 0 | |
| 14 | using season | | 0 | | 0 | |
| 15 | year of production | | 0 | 0 | | |
| 16 | product material | 0 | | 0 | 0 | |
| 17 | color | | 0 | | | |
| 18 | hue | | 0 | | | |
| 19 | brightness | | 0 | | | |
| 20 | chroma | | 0 | | | |
| 21 | design | | 0 | | | |
| 22 | shape of neck | | 0 | | 0 | |
| 23 | style of sleeve | | 0 | | 0 | |
| 24 | waist line | | 0 | | 0 | |
| 25 | pleats | | 0 | | | |
| 26 | pocket | | 0 | | 0 | |
| 27 | wrinkle-free | 0 | | | 0 | |
| 28 | sweat absorption | 0 | | | 0 | |
| 29 | settlement method | | | 0 | | |
| 30 | delivery date | | | 0 | | |
| 31 | delivery region | | | 0 | | |

FIG. 15A

| No. | product model name | company name | product satisfaction index | product dissatisfaction index | selling price | sale satisfaction price | product dissatisfaction factors |
|---|---|---|---|---|---|---|---|
| 1 | A3589 | Gemsung | 93.7 | 6.3 | 55,000 | 51,500 | brand perception |
| 2 | C5896 | Kornong | 91.9 | 8.1 | 53,000 | 48,700 | product material, pocket |
| 3 | D2879 | Star | 88.7 | 11.3 | 53,000 | 47,000 | brand perception, color |
| 4 | E5569 | Gucci | 87.9 | 12.1 | 54,000 | 47,400 | origin, brightness |
| 5 | C7788 | Heyin | 87.9 | 12.1 | 52,000 | 45,700 | producing method, brightness |
| 6 | A1012 | Nari | 84.8 | 15.2 | 45,000 | 38,100 | origin, hue, brightness |
| 7 | B3879 | Jane | 81.8 | 18.2 | 48,000 | 39,200 | brand perception, product material |
| 8 | F6897 | Hyensang | 78.8 | 21.2 | 44,000 | 34,600 | brand perception, hue, color, use |
| 9 | A2251 | Juhyun | 75.8 | 24.2 | 43,000 | 32,500 | brand perception, origin, hue, color |
| 10 | G5879 | Yujin | 72.7 | 27.3 | 42,000 | 30,500 | producing method, hue, brightness, color |

FIG. 15B

| No. | product model name | company name | product satisfaction index | product dissatisfaction index | selling price | sale satisfaction price | product dissatisfaction factors |
|---|---|---|---|---|---|---|---|
| 2 | C5896 | Kornong | 91.9 | 8.1 | 53,000 | 48,700 | product material, pocket |
| 4 | E5569 | Gucci | 87.9 | 12.1 | 54,000 | 47,400 | origin, brightness |
| 5 | C7788 | Heyin | 87.9 | 12.1 | 52,000 | 45,700 | producing method, brightness |
| 6 | A1012 | Nari | 84.8 | 15.2 | 45,000 | 38,100 | origin, hue, brightness |
| 10 | G5879 | Yujin | 72.7 | 27.3 | 42,000 | 30,500 | producing method, hue, brightness, color |
| 1 | A3589 | Gemsung | 93.7 | 6.3 | 55,000 | 51,500 | brand perception |
| 3 | D2879 | Star | 88.7 | 11.3 | 53,000 | 47,000 | brand perception, color |
| 8 | F6897 | Hyensang | 78.8 | 21.2 | 44,000 | 34,600 | brand perception, hue, color, use |
| 9 | A2251 | Juhyun | 75.8 | 24.2 | 43,000 | 32,500 | brand perception, origin, hue, color |
| 7 | B3879 | Jane | 81.8 | 18.2 | 48,000 | 39,200 | brand perception, product material |

FIG. 16

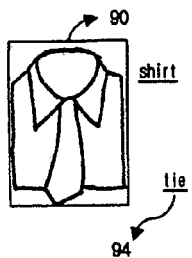
shirt
tie
90
94

| Basic purchasing conditions input sheet | |
|---|---|
| Product name | tie |
| set | unwanted○ wanted○ no relation◉ |
| size | [ ] won from [ ] won to |
| quantity of purchase | [ ] suit |
| user of product | the subject◉ the others○ no relation○ |
| Sex of user | male◉ female○ ambisextrous○ | age of user [ ] to [ ] years old |
| body type of use | big and plump○ big and lean○ small and plump○ small and lean○ no relation◉ |
| feeling | practical◉ classic○ comfortable○ refine○ elegance○ simple○ the others○ no relation○ |
| predominant item | quality○ design◉ price○ function/effect○ brand○ the others○ |

[ general retrieve ]   [ detailed retrieve ]

| Detailed purchasing conditions input sheet | |
|---|---|
| origin | domestic production◉ foreign production○ no relation○ |
| brand perception | high◉ normal○ low○ no relation○ |
| kind of production | self-production○ custom production(domestic)◉ custom production(foreign)○ the others no relation○ |
| producing method | handmade○ automatic production◉ combined product○ the others○ no relation○ |
| Construction of set | products of same kind○ suit○ trousers○ skirt○ jumper○ jacket○ overcoat○ shirt◉ cardigan○ vest○ knit○ the others○ no relation○ |
| usage | business◉ sports/leisure○ ordinary dress○ travel○ party○ condolence○ the others○ no relation○ |
| using season | all the year round○ spring○ summer○ autumn○ winter○ spring/summer○ spring/autumn○ spring/winter○ summer/autumn○ summer/winter○ autumn/winter◉ the others○ no relation○ |
| product material | wool○ cotton○ flax○ silk◉ leather○ mixed spinning○ velvet○ corduroy○ denim(jean)○ chemical fiber○ rayon○ the others○ no relation○ |
| hue | white series○ beige series○ yellow series○ red series◉ green series○ blue series○ violet series○ brown series○ gray series◉ black series○ mixed○ the others○ no relation○ |
| brightness | bright○ average○ dark○ no relation◉ |
| chroma | thin○ average○ deep○ no relation◉ |
| design | no○ check○ stripe○ spot/drop◉ the others○ no relation○ |
| length of tie | long◉ medium○ short○ no relation○ |
| width | wide◉ medium○ narrow◉ no relation○ |
| shape | pot◉ straight○ ribbon○ no relation○ |
| year of production | up-to-date◉ less than 3 months○ less than 6 months○ less than one year○ more than one year○ the others○ no relation○ |

[ Confirm ]   [ Correct ]   [ Cancel ]

FIG. 17

| Purchasing specification information | | | | |
|---|---|---|---|---|
| Purchased product specification | No. | Product name | Price range | Registration data |
| Product specification to be purchased | 1 | Tie | 50,000 | 2000-12-12 |
| | 2 | Dress shirt | 25,000 | 2000-06-25 |
| | 3 | Shirt | 20,000 | 2000-03-11 |
| | . | . | . | . |
| | . | . | . | . |
| | . | . | . | . |
| | n | Suit | 200,000 | 1999-10-17 |

30 — Purchasing specification information
32 — Purchased product specification
34 — Product specification to be purchased
321

METHOD AND SYSTEM FOR ELECTRONIC COMMERCE USING PRODUCTS SATISFACTION INDEX

CROSS-REFERENCES TO RELATED APPLICATIONS

This application is a continuation of pending International Patent Application No. PCT/KR02/00395 filed Mar. 7, 2002, which designates the United States and claims priority of pending Korean Application Nos. 2001/11593, filed Mar. 7, 2001 and 2001/88497 filed Dec. 29, 2001.

FIELD OF THE INVENTION

The present invention relates to a method and system for an electronic commerce employing a products satisfaction index, and more particularly, to a method and system for an electronic commerce capable of satisfying both a purchaser and a seller by computing a products satisfaction index with reference to products information provided by the seller and purchasing conditions provided by the purchaser, and computing a purchase satisfaction price on the basis of the products satisfaction index.

BACKGROUND OF THE INVENTION

Description of the Related Art

Generally, in case of retrieving products information to carry out an electric commerce over Internet, since the electric commerce is based on limited purchasing conditions such as product names, prices and the like, many products unsuitable for the purchasing conditions of a purchaser are unnecessarily displayed.

Accordingly, since the purchaser has to review the wanted products one by one, a lot of time is wasted for the search. In addition, in many cases the purchaser can not find its wanted products.

In order to solve these problems, many Internet sites come into existence. Some of the Internet sites require others or visitors to input an optional satisfaction value on purchasing conditions such as, quality, price, delivery, returning conditions, and other services of the product, thereby evaluating the products. To this end, the operator has to maintain transparency, such as neutrality, objectivity, fairness, and so forth, in operating the site. However, sellers or concerning parties may make attempts to increase the satisfaction value of the products by using improper means or methods.

Furthermore, since these searches do not reflect the purchasing conditions of the purchaser for its wanted products, the conventional retrieving means is not helpful to the purchaser.

Evaluation of the product by the judgment of the purchaser is one of the benefits provided to the purchaser by the Internet transactions, but it is also an important factor how much the purchaser can have confidence in the evaluations of others on the products they are searching.

Known methods for an electronic commerce on the Internet include cyber shopping, general auctions, reverse auctions, joint purchases and so forth. Most of them are of an inflexible price determining system in which the trade is performed based on the price presented by only one side such as the seller or the purchaser, but there is another price determining system capable of transacting the trade by performing the price determination at a price level that satisfies both of the seller and purchaser. In the electronic commerce transactions in which the purchaser offers the purchasing price, like an Internet shopping mall providing general auctions or reverse auctions, in case that the purchase offering price of the purchaser is not reasonable, the seller may often choose not to sell the product for a low contract price, but tries to employ every conceivable means and method to increase the contract price. To the contrary, if a product is to be sold at the offering price presented by the purchaser, the seller must put up with an extraordinary loss from the transaction. In addition, the purchaser, the seller and the operator of the Internet site must wait until a closing time for each transaction, and cannot undertake anything further. Accordingly, all of them may suffer from such unreasonable or inflexible electronic commerce transactions.

SUMMARY OF THE INVENTION

Therefore, an object of the present invention is to solve the problems involved in the conventional art, and to provide an electronic commerce method capable of evaluating the value of individual products and retrieving the product information on the basis of the value by quantitatively normalizing how much value individual products to be sold by the seller can satisfy for all of the purchasing conditions of the product to be purchased by the purchaser.

Another object of the present invention is to provide an electronic commerce method capable of providing a reasonable purchase offering price when purchasing the products by applying the quantified value for individual products of the purchaser to the selling price to compute a price satisfying the purchaser.

A value evaluation of a product is indicative of a price of the product, which can be specified as follows. A product is the result produced or manufactured to satisfy purchasing conditions (i.e., product features, specifications, or qualities) of the purchaser, and a product price is a price of the product for satisfying all of purchasing conditions of the purchaser for the product, which will be expressed as the below equation 1:

$$Ps = P1 + P2 + \ldots + Pn$$
$$= \sum_{k=1}^{n} Pk$$

wherein, Ps is the selling price of the product, and Pk is the price for a value satisfying one particular purchasing condition (among a group of conditions) of the purchaser related to the product.

Since the selling price (Ps) of the product is the total sum of the prices (Pk) for the value satisfying each purchasing condition of the purchaser with regard to the product, there is a close relationship between an entity of the product, such as a characteristic or property of the product, and various purchasing conditions of the purchaser.

Therefore, the relationship between various purchasing conditions of the purchaser and the entity of the product can be represented by one unified value system, which is equivalent to that of a degree of satisfaction of the purchaser for an individual product as represented by a quantified value. To this end, there is required a normalized and unified input format in processing various data of the sellers and purchasers, which is to be prepared by an operator for providing and adequately managing the system.

The operator prepares a standardized and unified input format for standard items or factors capable of being regarded as the purchasing conditions of the purchasers, and particulars of the respective standard items, relative to the entity of the product such as individual characteristics or properties of all of the products available for purchasing, thereby making a purchasing condition database. The operator provides the sellers with a request for products information registration, which can be provided by extracting the pre-defined purchasing conditions for purchasers with respect to their products for sale. A products information database is made for the contents inputted by the sellers through the request for products information registration, in which each of the standard items can be a field name of the products information database, and the particulars for the standard items consist of the contents of actual products information. The products information is not to be arbitrarily inputted by the sellers, but is to be inputted with the contents suitable for the characteristics of the products for sale from sample or standard data according to the input format provided by the operator.

On the other hand, the operator provides a potential purchaser with an input sheet, by extracting the pre-defined purchasing conditions corresponding to the product name selected by the purchaser from the purchasing condition database, so that the purchaser inputs the contents suitable for his or her purchasing conditions. Upon retrieving the products information, since the purchasing condition data provided by the purchaser can be compared with the corresponding fields of the products information database, a value of products satisfaction index (PSI) can be obtained by computing operation. In this regard, the operator compares the contents inputted by the purchaser with the contents of the products information, and shows the purchaser the results in a quantified value of the product satisfaction index.

Since the products satisfaction index is a general index indicative of the products relative to the purchasing conditions of the purchaser, the product searching process can be easily performed by using this value, and thus target products can be easily, quickly and exactly found. This is beneficial contrary to the conventional method of retrieving and reviewing the target products one by one among a group of products searched while comparing with purchasing conditions for the products, such as a price condition and other conditions.

Even though in certain cases the selling price can be satisfied to the particular seller, satisfaction of the purchasers as to the selling price of the product is different from each other since the purchasing conditions are different depending on each individual. Therefore, it is beneficial for the operator to know the patterns and how does each purchaser approves the products for purchasing and how much would be the appropriate selling price to generally satisfy the purchasers.

Accordingly, the present invention provides a method of computing a price for generally satisfying the purchasers, i.e., a purchase satisfaction price (PSP), which can be computed by multiplying the purchasing satisfaction index for the individual product by the selling price. Since the purchase satisfaction price is determined by both the purchasers and the seller, they are generally satisfied with this price, and thus, the purchase satisfaction price may be utilized as a purchase offering price. In addition, it is easy for a potential buyer to select the products by displaying it together with the products satisfaction index.

When the products dissatisfaction index is computed on the basis of the products satisfaction index and is applied to the selling price, a reduced price can be obtained for reducing according to a degree of the dissatisfaction for the product. Thus, the purchasing possibility may be increased by applying these methods to the electronic commerce, and the selling promotion of the sellers and the profits increase of the site operator may be achieved.

In particular, the present invention introduces a sale approval price, so that the sellers can flexibly manage the price. Therefore, the sellers cope easily with the purchase satisfaction price of the purchasers, and is freed from the burden for monitoring competitive pricings with the products of other companies. Also, it is possible to prevent the potential violations in a commercial transaction of the sellers due to an unreasonably low contract price offered by the purchaser.

Furthermore, since the system of the present invention provides a direct connection from the products information retrieval to the product purchase, it may prevent the purchasers from leaving the site to other sites. The sellers can easily regulate the minimum selling approval price at any time on the consideration of the products satisfaction index or other quantified index or data described above, so that potential purchasing clients can easily conclude the purchasing. Since various purchasing conditions of the purchasers are applied to the sales products of the sellers, statistical data and information of such transactions usable in the object economy sectors may be provided to the manufactures, the producers, the distributors and other companies starting a new business, for their benefits.

It is to be understood that both the foregoing general description and the following detailed description of the present invention are exemplary and explanatory and are intended to provide further explanation of the present invention as claimed.

BRIEF DESCRIPTION OF THE DRAWINGS

The above objects, other features and advantages of the present invention will become more apparent by describing the preferred embodiment thereof with reference to the accompanying drawings, in which:

FIG. 11A shows a request of products information registration inputted by seller according to an embodiment of the present invention.

FIG. 11B shows an example of a minimum sale approval price according to the products satisfaction index in FIG. 11A.

FIG. 12A shows a basic purchasing condition input sheet of a purchaser according to an embodiment of the present invention.

FIG. 12B shows an example of products information provided in case of clicking a detail retrieving button of the basic purchasing condition input sheet in FIG. 12A.

FIG. 12C shows a detailed purchasing condition input sheet according to an embodiment of the present invention.

FIG. 13 shows a classification table of various purchasing conditions related to products selection criteria items and comparative prominent items of a product "shirt" according to an embodiment of the present invention.

FIG. 15A shows a comparative specification indicative of a retrieved result on the basis of a products satisfaction index according to an embodiment of the present invention.

FIG. 15B shows a comparative specification in which the comparative specification in FIG. 15A is rearranged on the basis of a priority of a purchasing condition according to an embodiment of the present invention.

FIG. 16 shows a screen displaying a detail purchasing condition input sheet in which an initial value for products information is mentioned when clicking a product icon according to an embodiment of the present invention.

FIG. 17 shows a sub-menu displayed in case of selecting purchasing specification inquiring items in FIG. 10.

DETAILED DESCRIPTION OF THE DRAWINGS

Reference will now be made in detail to preferred embodiments of the present invention.

Now, preferred embodiments of the present invention will be described in detail with reference to the annexed drawings. A sales product of a seller applied to the present invention comprises all items (hereinafter referred to as "products") of which business transactions are carried out over the Internet, such as natural products, products, services, ideas, information, and several marketable securities (e.g., gift certificates, advance tickets, stocks, bonds and so forth).

Figure 1:
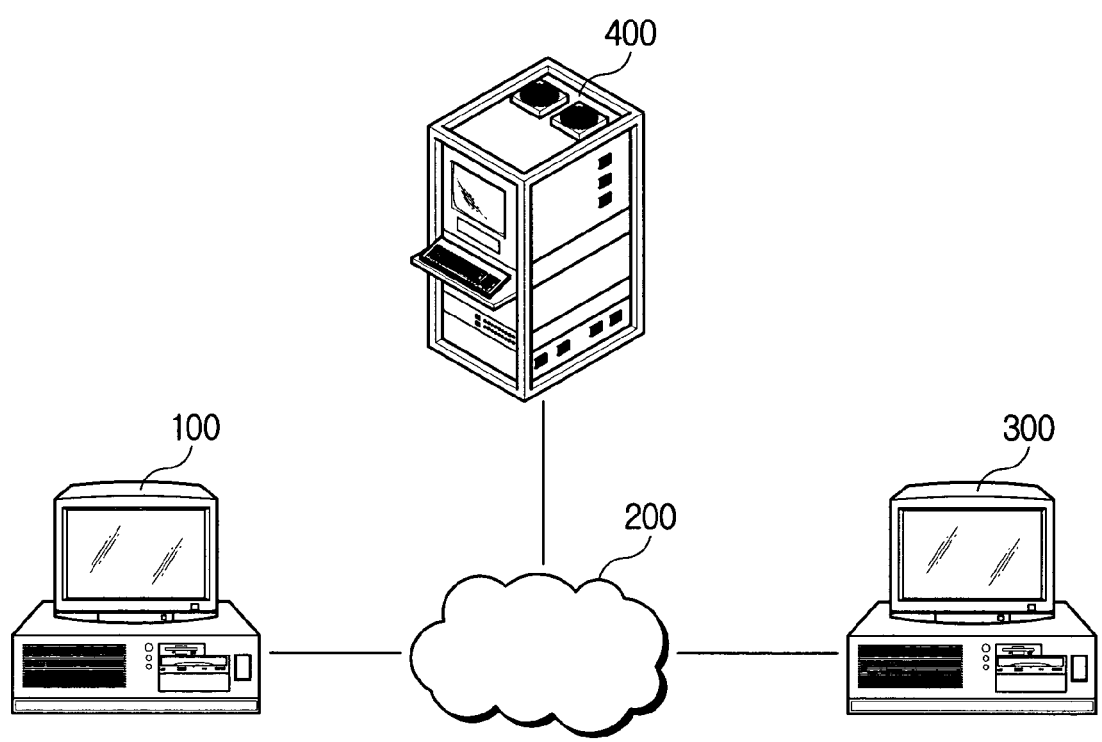
FIG. 1 is a network diagram of an electronic commercial system applied to the present invention.

FIG. 1 is a network diagram of an electronic commercial system applied to the present invention.

As shown in FIG. 1, a purchaser client 100 and a seller client 300 can access to an operation server 400 over Internet 200, respectively.

The purchaser client 100, the seller client 300, and the operation server 400 comprise a computer system or cable and wireless terminal having a proper Web browser, respectively.

Figure 2:
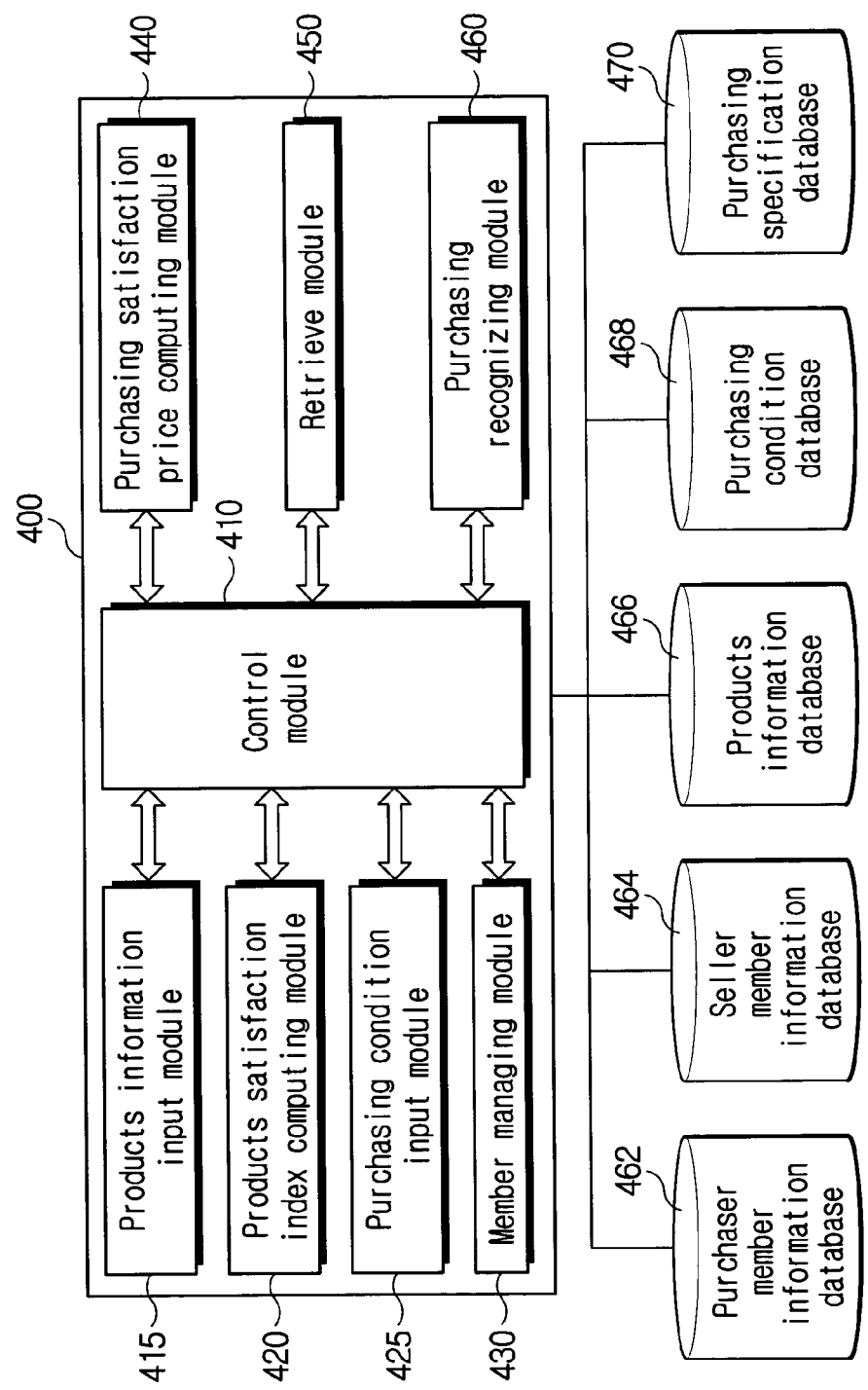
FIG. 2 is a block diagram of the operation server according to the present invention.

FIG. 2 is a block diagram of the operation server according to the present invention.

Information on items of a purchasing condition input sheet provided to the purchaser and detailed information related to each item are stored in a purchasing condition database 468 for every product. Products information input module 415 extracts items capable of being regarded as the purchasing conditions of the purchaser related to the product which is to be sold by the seller, from the purchasing condition database 468 to prepare a request of products information registration, and the request of products information registration is provided to the seller, so that the products information is stored in the products information database 466.

A purchasing condition input module 425 provides a purchasing condition input sheet related to a first retrieved product to the purchaser to input a basic purchasing condition and a detailed purchasing condition.

A member manage module 430 receives personal information from the purchaser and the seller, and stores it in a purchaser member information database 462 and a seller member information database 464, respectively.

A products satisfaction index computing module 420 compares the products information stored by the seller with the purchasing condition inputted by the purchaser to compute products satisfaction index of individual product.

A purchasing satisfaction condition computing module 440 computes a purchasing satisfaction condition on the basis of the computed products satisfaction index.

A retrieve module 450 receives a name of the product and the price condition, and performs the first retrieve. And then, the retrieve module 450 performs the second retrieve in accordance with several purchasing conditions, the third retrieve in accordance with the products satisfaction index, and the final retrieve in accordance with the purchasing condition priorities, respectively.

A purchase approval module 460 determines whether the purchasing satisfaction condition of the product selected by the purchaser belongs to a range of sale approval price of the seller, based on the final retrieve, displays the results of the purchase approval on a screen, and stores the purchasing specification in the purchasing specification database 470.

A control module 410 controls a data stream between modules and the storage and output of the data from the databases.

Figure 3:
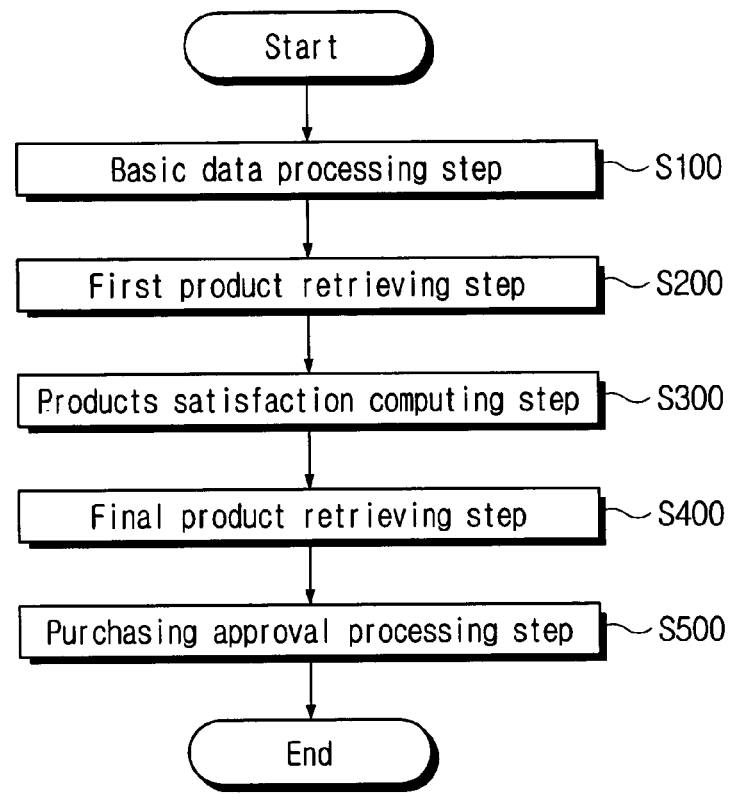
FIG. 3 is a flowchart of the electric commerce method according to the present invention.

FIG. 3 is a flowchart of the electric commerce process according to the present invention.

Referring to FIG. 3, in a basic data processing step S100, the member information related to the purchaser and the seller is inputted and stored in the seller and the purchaser member information databases. The products information inputted from the seller is stored in the products information database.

In a first product retrieving step S200, the product name to be purchased and the price condition are inputted to show them to the purchaser.

In a products satisfaction index computing step S300, it compares the products information inputted by the seller with several purchasing conditions inputted by the purchaser regarding the first retrieved product to compute the products satisfaction index of individual product and thus compute the purchasing satisfaction condition.

In a final retrieving step S400, the final retrieve is performed by inputting a value of the products satisfaction index, otherwise the final retrieve is preferably added in accordance with the priority of the purchasing condition. Alternatively, the product retrieve is finally performed by simultaneously comparing individual characteristics or property of the whole group of products to be retrieved according to a single purchasing condition.

In a purchase approval processing step S500, it compares a purchase offer price with a purchase satisfaction price and a minimum purchase approvable price according to the products satisfaction index, thereby admitting the purchase.

The steps described above will now be explained in detail.

Figure 4:
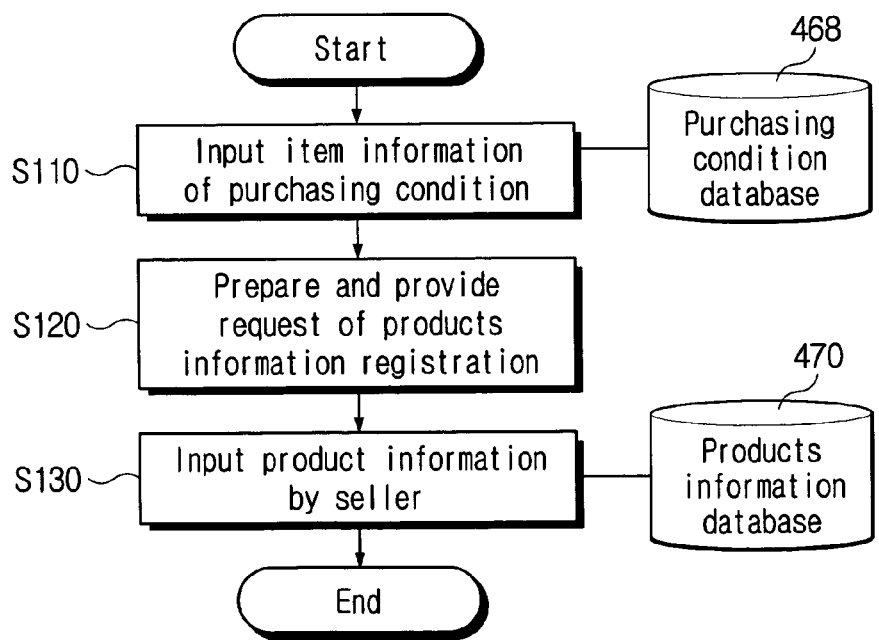
FIG. 4 is a flowchart explaining the basic data processing process in FIG. 3.

FIG. 4 is a flowchart explaining the basic data processing process.

First, an operator prepares a standardized and unified input format for standard items on factors capable of being regarded as the purchasing condition of the purchaser, and particulars of each standard items, relative to the entity of the product such as individual characteristic or property of the all products to be purchased, thereby making the purchasing condition database 468. (step S110)

The operator provides the seller with the request of products information registration, which is prepared by extracting the purchasing condition of the purchaser related to the product to be purchased by the seller (step S120).

If the seller accesses to the operation server and inputs an identification and a password of the seller, the member managing module of the operation server transfers the member information to the control module to determine whether the seller is a member based on the member information stored in the seller member information database. If the seller is not the member, a message for joining a member is displayed.

The seller member information database comprises, for example, a seller's ID, a name of a company, a number of business registration, a name of a representation, a number of social security of the representation, a name of a Web site, an e-mail address, a telephone number, an address, a state, a kind of business (e.g., a large enterprise, a small-medium industry, a venture, an individual and so forth), a capital, the number of employs, a year of the establishment of company, sales products, a registration date, and so forth, as a field.

If it is identified as a member, the seller inputs various products information to be sold (step S130). The operation server provides the seller with the request of products information registration on-line to obtain the products information, as shown in FIG. 11A, and the inputted information is stored in the products information database 470. As described below, the field of the products information database is adapted to be correspondent to various purchasing conditions of the purchaser, so that it is possible to compare it with the purchasing condition of the purchaser, thereby computing the products satisfaction index.

Each field of the products information database includes various particulars composed of a proper noun, a common noun and numerals suitable for the characteristic of each field. For example, in case of clothing, it is provided on a material of the product, which is a standard of an objective judgment, with a format of the proper or common noun such as "natural fiber (cotton, wool, leather and so forth)", "chemical fiber (nylon, synthetic resin and so forth)", "compound fiber", or the like. Otherwise, it is provided on the elasticity of the product, which is a standard of a future-oriented, abstractive or subjective judgment, with a format of a verbal noun such as "good", "common", "bad", or the like, the common noun such as "good", "commonness", "badness", or the like, or the numerals indicative of its size such as "3", "2", "1", or the like.

If the purchaser accesses to the operation server and inputs the ID and password of the seller, the member managing module of the operation server transfers the member information to the control module, thereby determining whether the seller is a member based on the member information stored in the seller member information database. If the seller is not the member, a message for joining a member is displayed.

The fields of the purchaser member information database comprise an ID, a name, a social security number, a sex, an age, an address, a telephone number, a mobile number, an e-mail address, a school education, an interest, a special skill, an occupation, a joining data and the like. If identified as the member, the purchaser can be provided with services of the products information retrieve and the electro commerce.

Figure 5:
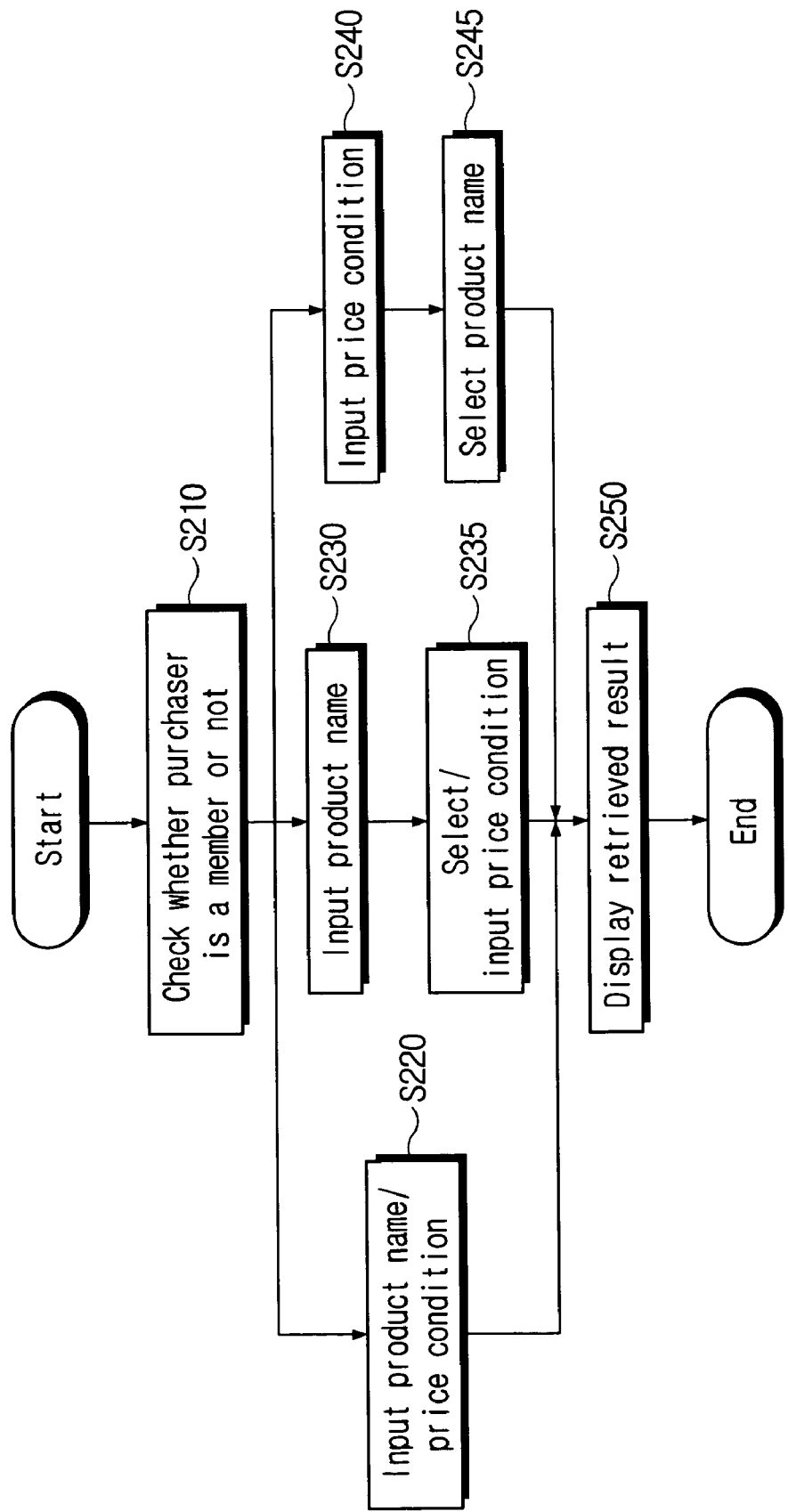
FIG. 5 is a flowchart explaining the first product retrieving process in FIG. 3.

FIG. 5 is a flowchart explaining the first product retrieving process.

First, the operation server receives the ID and password from the accessed purchaser to check whether the purchaser is a member or not (step S210).

Keywords inputted for first retrieving the product are its name and price condition. In case of knowing both of them, the name and price condition are simultaneously inputted to perform the retrieve (step S220). The purchaser inputs directly the name and price condition, or inputs them indirectly by selecting product icon corresponding to the wanted name and price.

In case of not knowing the price condition, if the purchaser inputs the name of the product (step S230), minimum and maximum prices set to the corresponding product are displayed, so that the purchaser selects one among them or inputs the price condition directly (step S235).

In addition, in case of not knowing the name of the product, if the purchaser inputs the price condition (step S240), the names of the product corresponding to the price condition are displayed, so that the purchaser selects one among them (step S245).

If the name and price condition of the product are inputted for the first product retrieve through the method as described above, the corresponding products information is extracted from the products information database and is displayed (step S250).

Figure 6:
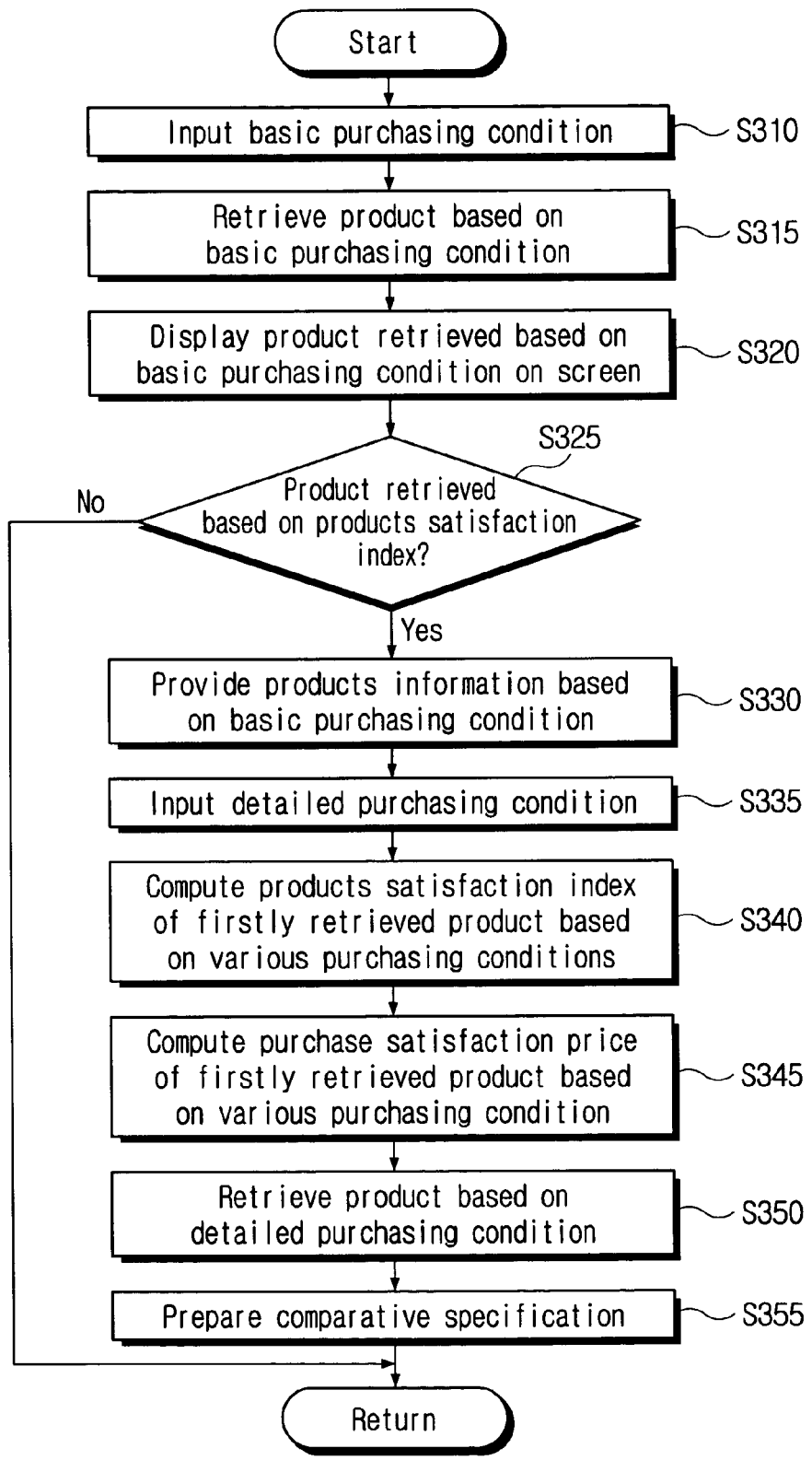
FIG. 6 is a flowchart illustrating the products satisfaction index computing process in FIG. 3.

FIG. 6 is a flowchart illustrating the products satisfaction index computing process according to the present invention.

First, the basic purchasing condition related to the product retrieved first is inputted (step S310).

The purchasing condition is classified into the basic purchasing condition and the detailed purchasing condition. The basic purchasing condition comprises the conditions related directly to the purchaser, for example, an appearance (e.g., physical conditions), an age, a sex, a marriage, an occupation, usage and the like. The detailed purchasing condition comprises the conditions related directly to the characteristic or property of the product, and the conditions related to a manufacturer and seller such as quality, function, design, color, kind of product, conditions of delivery, payment terms and the like. The total purchasing condition items is stored in fields of the purchasing condition database. If the product to be purchased is selected through the first retrieve, the items corresponding to that are extracted from the purchasing condition database, and are provided to the purchaser in a type of input sheet as shown in FIG. 12A.

If the input is completed as described, the retrieve on the product is performed based on the basic purchasing condition (step S315), and the selected products are displayed on the screen according to the retrieve results (step S320).

And then, it is determined whether it proceeds to the product retrieve based on the products satisfaction index (step S325), and in case of progressing the product retrieve, the products information is provided according to the basic purchasing condition (step S330).

The products information comprises a portion of conditions composed of well-sold products, a new product, conditions related directly to the characteristic or property of the product, and purchasing conditions related to the manufacturer and seller such as quality, function, design, color, kind of product, conditions of delivery, payment terms and the like, The purchaser inputs the detailed purchasing condition with reference to the products information (step S335). For example, if the purchaser wants the information on the well-sold products among the basic purchasing condition, statistics of such information is prepared by the purchasing specification database, and the particulars of various purchasing condition items are checked off on the detailed purchasing condition input sheet, as shown in FIG. 12C. If there is any item not suitable to the propensity to purchase of the purchaser, the purchaser may modify the particulars of each purchasing condition item.

The products satisfaction index (PSI) of products which is first retrieved by the inputted purchasing conditions is computed (step S340).

The computation of the products satisfaction index of the first retrieve product on the basis of various purchasing conditions is represented by means of numerical values by grasping the number of elements common to the elements related to the entity of the product and the purchasing condition of the purchaser. The products satisfaction index is computed by comparing the products information database for a group of the product retrieved by the first product retrieve with the purchasing condition input sheet inputted by the purchaser. The products satisfaction index may be computed by two methods, for example, a ratio method and a weight applying method. The values of the products satisfaction index computed by the above method are displayed together with the item of the retrieved product. Since the purchaser can judge all of the individual product using the value only, the products satisfaction index is useful to the product retrieve.

It will now be explained on a kind of method of computing the products satisfaction index.

1. Ratio Method

The products satisfaction index means a percentage of the number of the respective purchasing condition items identical to the corresponding fields of the products information database over the total purchasing condition items of the purchaser, which will be expressed as a below equation 2:

$$Is=(Nc/Nt)\times 100$$

wherein, Is is the products satisfaction index, Nc is the number of the respective purchasing condition items identical to the corresponding fields of the products information database, and Nt is the total purchasing condition items of the purchaser.

2. Weight Applying Method

A seller can sell some of their products predominantly over the products of other companies, if such items have the same features satisfying the purchasing conditions of the purchasers (these features or conditions of the seller's products are to be referred in this disclosure as "predominant item(s)"). On the other hand, a purchaser has its own standard of selecting the products, i.e., some criteria (or purchasing conditions) to be seriously considered when purchasing the products (these purchasing conditions are to be referred in this disclosure as "product selection criteria"). The present method computes the products satisfaction index by weighing more heavily on the items or conditions identical to both the seller and purchaser, and accordingly the products satisfaction index is computed by reflecting the will of the seller and purchaser together. When the inputted content of the "predominant item" of the seller is identical to that of the "product selection criteria" among the purchasing condition items of the purchaser, the ratio method applies in a manner weighing these purchasing condition items several times heavier than other purchasing condition items. This method will be expressed as a below equation 3:

$$Is=\{(xNcs+Nct)/(xNs+(Nt-Ns))\}\times 100$$

wherein, Is is the products satisfaction index, Ncs is the number of the purchasing conditions in which the contents of "predominant item" stored in the products information database is identical to that of the "product selection criteria" among the purchasing condition items, Nct is the number of the remaining purchasing condition items (i.e., that the contents of "predominant item" in the products information database is different from that of the "product selection criteria"), Ns is the number of purchasing condition items corresponding to the "predominant item" of the products information database and the "product selection criteria" items among the purchasing condition items, Nt is the total purchasing condition items of the purchaser, and x is a weight on each item of which the contents is identical between the number of purchasing condition items related to the "predominant item" of the products information database and the "product selection criteria" items among the purchasing condition items.

According to products dissatisfaction index (Iu) contrary to the products satisfaction index, it is represented as a value to what extent the individual product to be sold by the seller satisfies the whole purchasing conditions for the product to be retrieved by the purchaser. The products dissatisfaction index means a ratio of the number (Nu) of inconsistent items between the fields of the products information database and the purchasing condition items over the total items (Nt). In addition, in case that individual product to be sold by the purchaser satisfies all of the purchasing conditions for the products to be retrieved by the purchaser, the products dissatisfaction index is represented by a value obtained by subtracting the products satisfaction index from 100 of the maximum products satisfaction index, which will be expressed as a below equation 4:

$$Iu=(Nu/Nt)\times 100=100-Is$$

wherein, Iu is the products dissatisfaction index, Nu is a ratio of the number of inconsistent items between the fields of the products information database and the purchasing condition items over the total items, Nt is the total purchasing condition items of the purchaser, and Is is the products satisfaction index.

If the products satisfaction index is computed as described above, the purchasing satisfaction condition is computed depending upon the computed products satisfaction index. (step S345)

The products satisfaction index evaluates the value of the product by use of indexes on behalf of the purchaser and the product. If the products satisfaction index is applied to the selling price of the seller, the price is reasonable to the product of the seller in a position of the purchaser. Accordingly, it is a purchasing satisfaction condition of the purchaser, and so may be used as a purchase offering price at the electron commerce. The purchasing satisfaction condition may be computed by use of a method using the products satisfaction index and a method using the products dissatisfaction index, and will now be described hereinafter.

1. Method Using the Products Satisfaction Index

The purchase satisfaction price (Psp) means a price computed by multiplying a selling price (Ps) of individual product by the products satisfaction index (Is) of the purchaser on the product, which will be expressed as a below equation 5:

$$Psp=Ps\times Is$$

wherein, Psp is the purchasing satisfaction condition, Ps is the selling price of individual product, and Is is the products satisfaction index.

2. Method Using the Products Dissatisfaction Index

The purchase satisfaction price (Psp) according to the products dissatisfaction index is a price obtained from computing the selling price (Ps) of individual product in terms of a reduced price (Pr) corresponding to the product dissatisfaction price and subtracting the reduced price from the selling price, which will be expressed as a below equation 6:

$$Psp=Ps-Pr=Ps-\{Ps\times(100-Is)\}/100=Ps-(Ps\times Iu)/100$$

wherein, Psp is the purchasing satisfaction price, Ps is the selling price of individual product, Pr is the reduced price, Is is the products satisfaction index, and Iu is the products dissatisfaction index.

After computing the products satisfaction index and the purchasing satisfaction condition, the product retrieve is performed (step S350), and a comparative specification is prepared (step S355). Specifically, the comparative specification including several major items such as the products satisfaction index and the purchasing satisfaction condition for the first retrieved products, as well as the information on individual product is prepared and provided to the purchaser, so that the purchaser can compare and consider the information on the retrieved results. The comparative specification includes a brand, a company name, the products satisfaction index, the purchasing satisfaction condition, the products dissatisfaction index, the selling price, factors of product dissatisfaction, and is arranged and displayed in order of a magnitude of the products satisfaction index. The factors of product dissatisfaction consist of the inconsistent items between items of the purchasing condition input sheet and the products information database, and are displayed so that the purchaser may refer to them when retrieving or purchasing the products.

Figure 7:
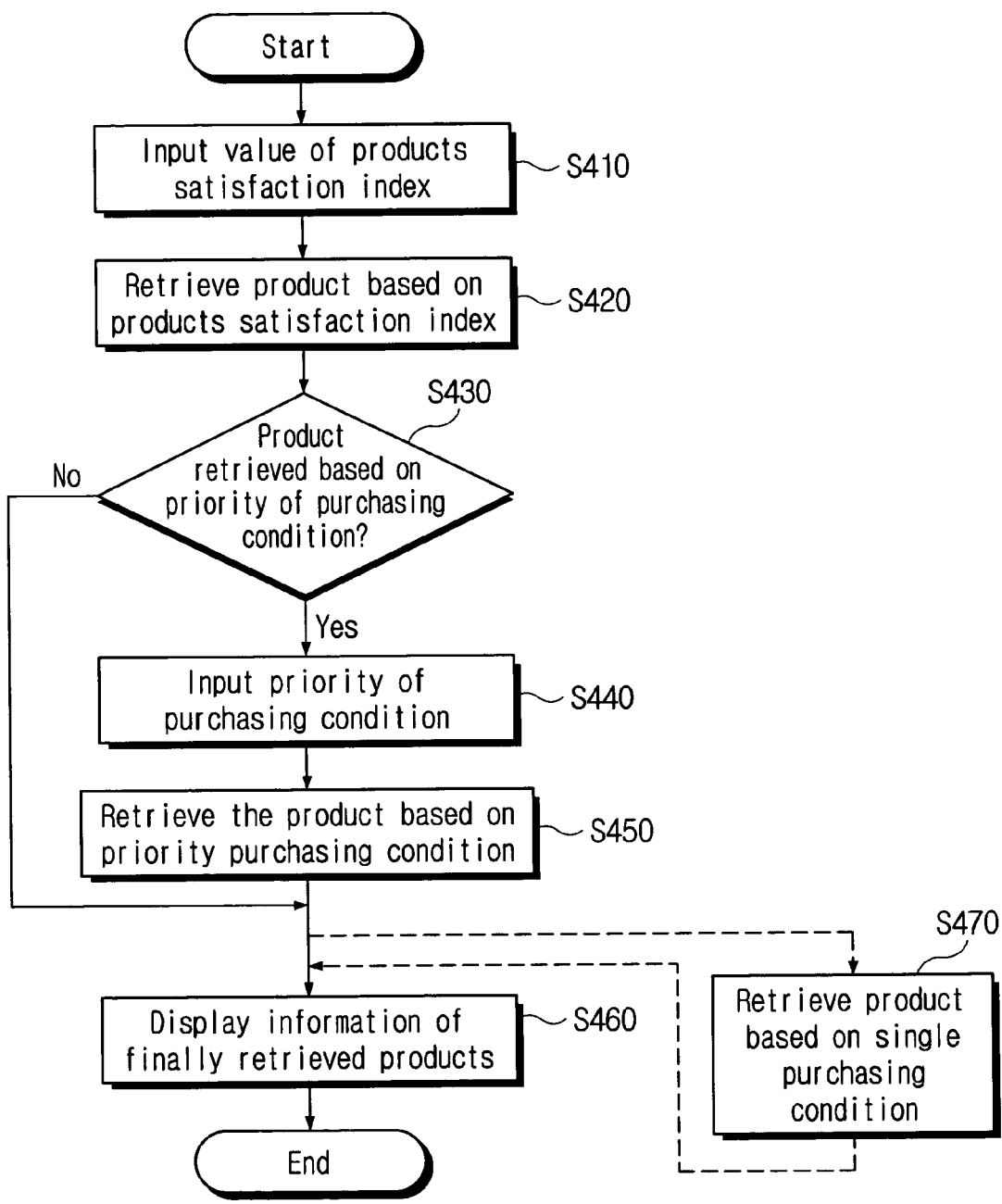
FIG. 7 shows a flowchart illustrating a final product retrieving process in FIG. 3.

FIG. 7 shows a flowchart illustrating a final product retrieving process in FIG. 3.

First, when the desired (e.g., minimum) numeric value of the products satisfaction index is inputted by the purchaser (step S410), the products belonging to a range above the numeric value of the products satisfaction index inputted for the group of the first retrieved products are rearranged and displayed (step S420).

Now, the purchaser can determine whether the final product retrieve is to be performed depending upon the priority of the purchasing condition (step S430), and in case of not performing the final product retrieve based on the priority of the purchasing condition, it proceeds to the purchase. To the contrary, in case of performing the final product retrieve based on the priority of the purchasing condition, the priority of the purchasing condition is inputted by the purchaser (step S440), the product retrieve is again performed (step S450) based on the priority of the purchasing condition, and the results of the final retrieve are displayed (step S460). However high the products satisfaction index is for the retrieved product based on the numeric value of the products satisfaction index, if it does not satisfy at least some of the purchasing condition items which are considered as important factors to the purchaser for purchasing, the product may not be one needed by the purchaser. Therefore, the final retrieve may be performed on the basis of the priority on various purchasing condition items previously inputted by the purchaser.

In addition, if a single purchasing condition is inputted, the particulars of the purchasing condition items corresponding to the whole group of the products are extracted from the products information database, and the contents is displayed on the screen, thereby retrieving the final product (step S470).

Figure 8:
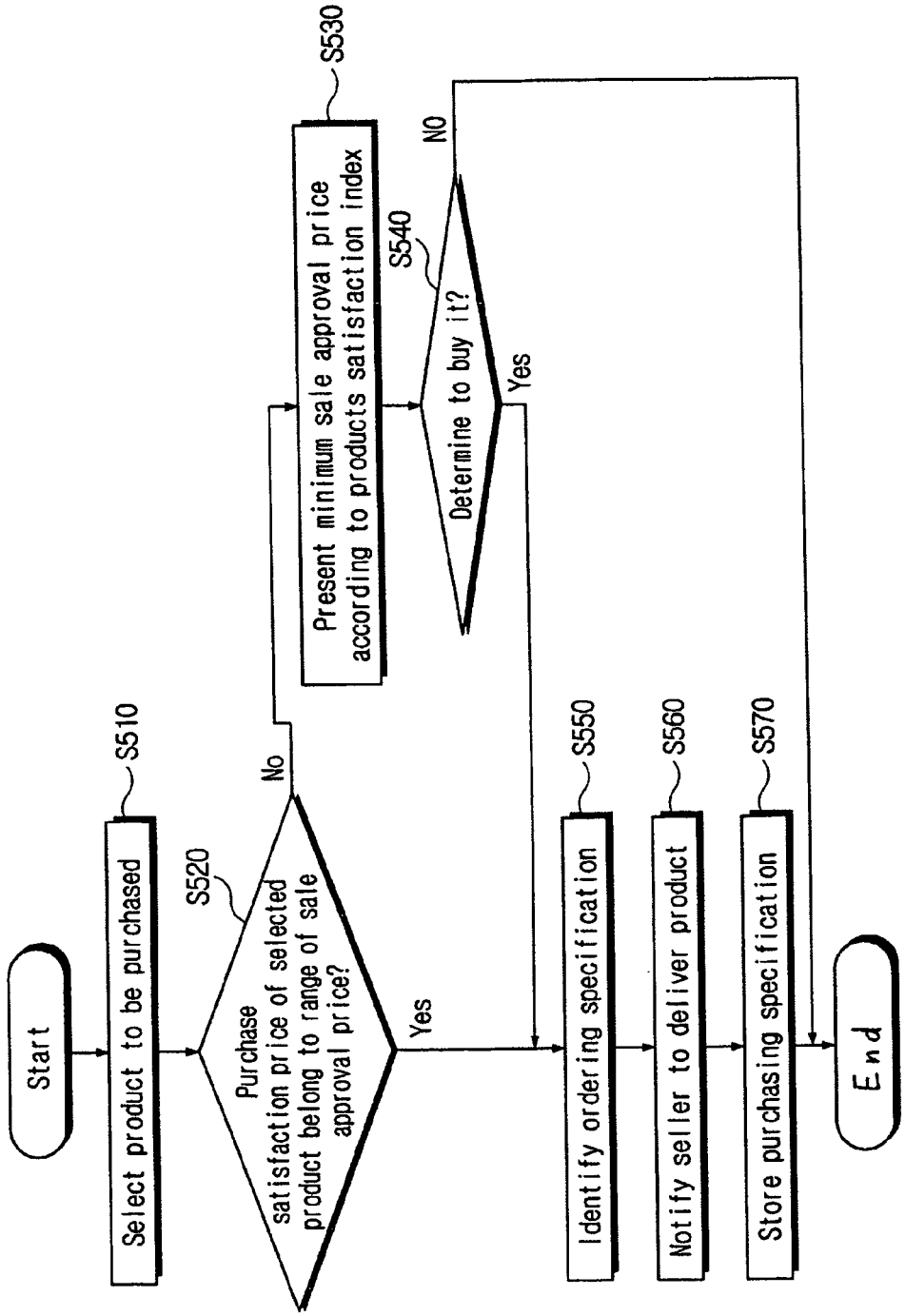
FIG. 8 is a flowchart illustrating a purchase approval process in FIG. 3.

FIG. 8 is a flowchart illustrating a purchase approval process in FIG. 3.

If the purchaser selects the product to be purchased (step S510), it determines whether the purchasing satisfaction condition of the selected product belongs to a range of the sale approval price of the products information database of the seller (step S520). If the purchasing satisfaction condition of the selected product belongs to a range of the sale approval price, the order specification is identified (step S550). After it reports the delivery of the product to the seller (step S550), the purchasing specification is stored in the purchasing specification database (step S570).

If the purchasing satisfaction condition of the selected product does not belong to a range of sale approval price, the minimum sale approval price is presented from the products information database depending upon the products satisfaction index (step S530), and the purchaser again determines whether to purchase or not (step S540). After all, the purchasing satisfaction condition and the minimum sale approval price are a buying and selling price between the purchaser and the seller. If the minimum sale approval price is readily utilized depending upon the products satisfaction index, a latent purchasing client can be directly connected to the purchase. Therefore, it becomes the means of an important price policy.

Figure 9:
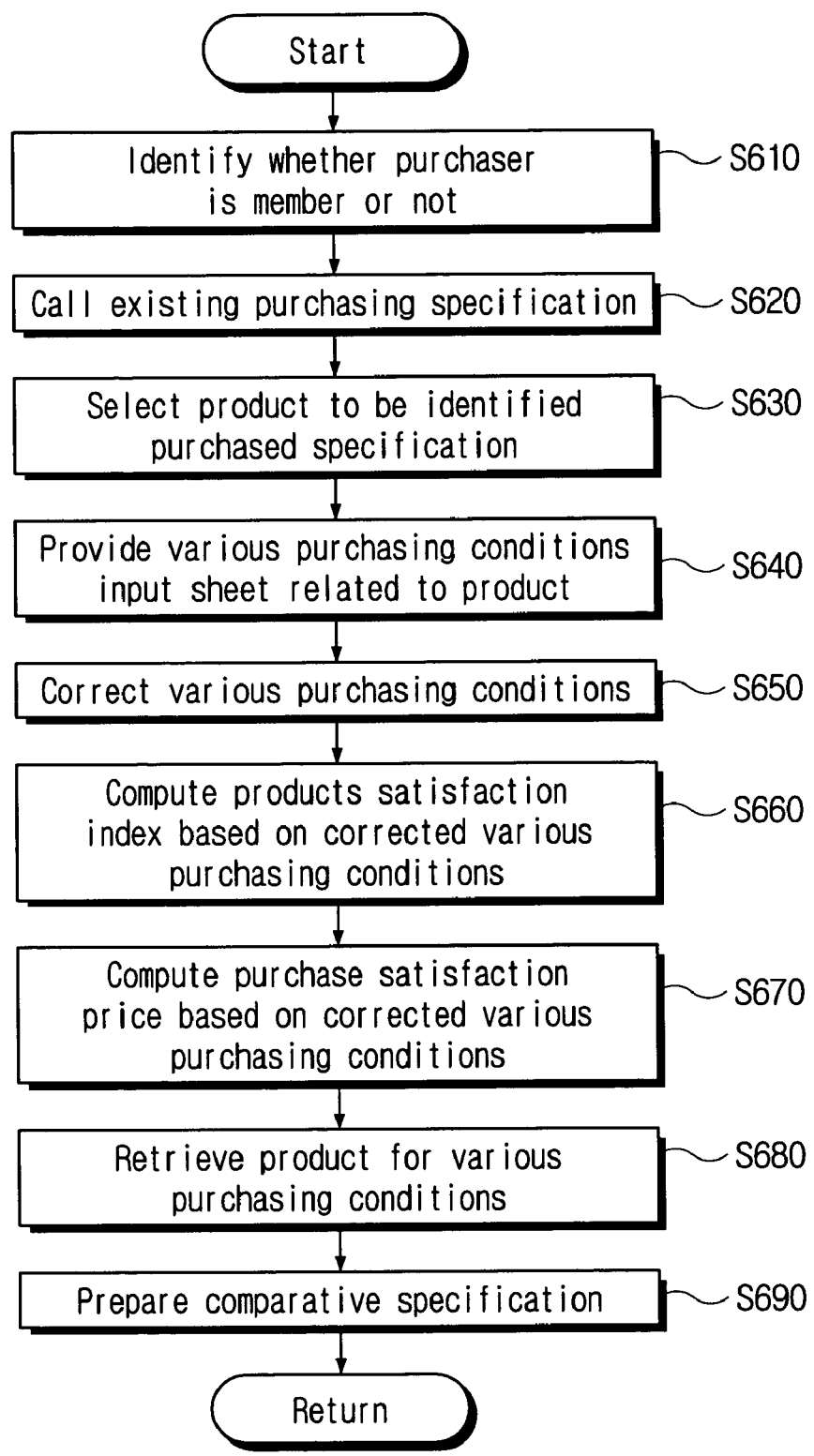
FIG. 9 is a flowchart explaining a process of reusing the purchasing specification information of the present invention.

FIG. 9 is a flowchart explaining a process of reusing the purchasing specification information.

If it determines whether the purchaser is a member (step S610), the purchasing specification previously stored is called from the purchasing specification information database (step S620), and the purchased products specification and the products specification to be purchased are shown. If the purchaser selects the product of which the purchasing specification is to be identified (step S630), various purchasing condition input sheets are provided (step S640). At that time, if various purchasing conditions are modified (step S650), the products satisfaction index (PSI) is computed depending upon various modified purchasing conditions (step S660). If the purchasing satisfaction condition (PSP) is computed (step S670), the product retrieve is performed (step S680), and the comparative specification is outputted on the screen (step S690). In case of approving the purchase for the product, which is not purchased at present but is latently purchased, contained in a temporary keeping box (e.g., putting in a shopping basket), the information related to the product is stored in the purchasing specification database, and may be reused when purchasing the product after this or repurchasing the purchased product.

One preferred embodiment of the present invention will now be described with reference to FIGS. 10 to 17.

Figure 10:
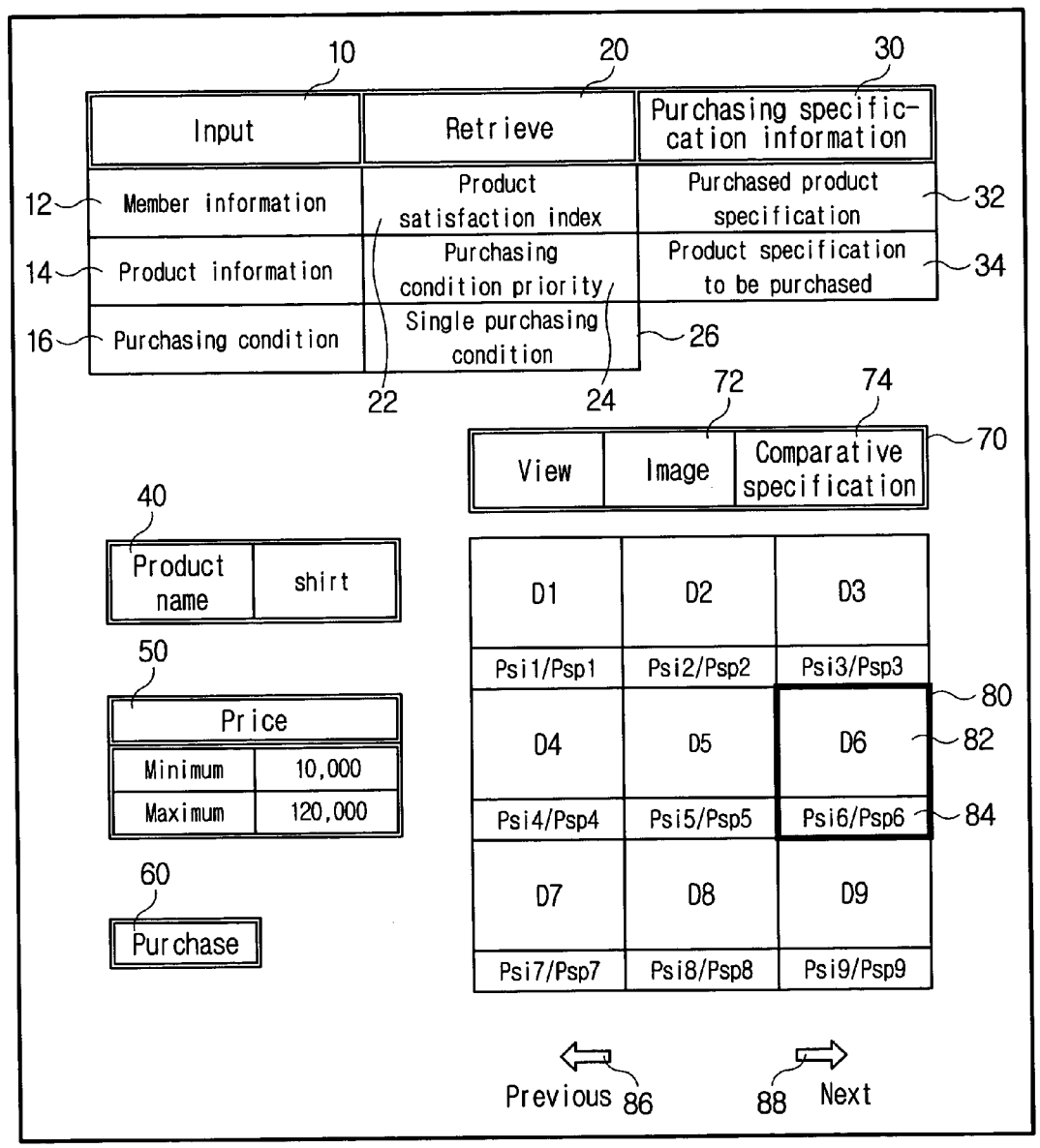
FIG. 10 shows an example of an initial screen displayed on a display unit of the seller or the purchaser.

FIG. 10 shows an example of an initial screen displayed on a display unit of the seller or the purchaser.

The initial screen includes an input item 10, a retrieve item 20, and a purchasing specification inquiring item 30. The input item is allocated with a member information input button 12, a products information input button 14, and a purchasing condition input button 16. The retrieve item 20 is allocated with a retrieve button 22 for the products satisfaction index, a retrieve button 24 for the priority of the purchasing condition, and a retrieve button 26 for a single purchasing condition. The purchasing specification inquiring item 30 is allocated with a purchased products specification inquiring button 32 and a purchasing products specification inquiring button 34.

If the member information input button 12 is selected, the member joining of the purchaser or the seller is achieved or it may identify whether to be a member or not.

If the products information input button 14 is selected, the request of products information registration is displayed, as shown in FIG. 11A, the request of products information registration including a selling price, the sale approval price according to the products satisfaction index, and items to be contained in various purchasing conditions.

The purchase approval is determined depending upon the sale approval price when the purchaser represents the purchasing satisfaction condition. The sale approval price according to the products satisfaction index is provided in the type shown in FIG. 11B. If the seller inputs a discount rate suitable to the price policy of the seller on a blank of discount rate, the minimum sale approval price is computed. By properly utilizing it, the latent purchasing client can be directly connected to the purchase.

"Whether or not a product set" and "construction of set" items are used at a multiple retrieve, and in the embodiment of the present invention the construction of set includes shirt/shirt, shirt/trousers, shirt/cardigan, and shirt/tie. The purchaser may retrieve the trousers, cardigan, and tie, simultaneously.

A "comparative dominant item" is to compute the products satisfaction index according to the weight applying method. Specifically, the products satisfaction index is computed by comparing the comparative dominant item with the products selection criteria item of the purchaser and weighing the purchasing condition item related thereto.

If the products information is inputted and a registration button is pushed, as shown in FIG. 11A, each item of the contents and the contents of the particulars are stored in the products information database of the operator. In order to input the updated products information, if the seller pushes the modifying button and inputs an ID, a brand and a model number, the data previously inputted is displayed, and the modification is achieved herein. A cancel button is used to cancel the inputted products information.

FIG. 11A shows one embodiment of the present invention, in which the ID of the seller is "kmix". The seller inputs the products information of a men's shirt, of which it is suitable to an age from 18 years old to 50 years old, the selling price is 53,000 won, and its model number is C5896. It will be seen that the quality of the product is a comparative predominant over the others.

If the purchasing condition input button 16 is clicked, as shown in FIG. 12A, the basic purchasing condition input sheet is provided. If the purchaser inputs the brand, the basic purchasing condition items related to the product is displayed on the input sheet. The purchaser inputs the purchasing condition and pushes a general retrieve button to carry on retrieve.

Meanwhile, if the purchaser pushes a detailed retrieve button to obtain the products satisfaction index or the purchasing satisfaction condition, the detailed purchasing condition input sheet in FIG. 12C is provided. If the input is completed, the products satisfaction index and the purchasing satisfaction condition are computed and the results of the product retrieve are displayed on the screen.

Referring to FIG. 12C, the "construction of set" item is activated in case of needing the set in the basic purchasing condition input sheet of FIG. 12A, or is inactivated in case of not requiring the set. Meanwhile, the products information suitable to various purchasing conditions of the basic purchasing condition input sheet is provided as shown in FIG. 12B. If the product retrieve is required depending upon the purchasing condition, some items of the detailed purchasing conditions are applied and displayed as the contents of the products information. If it is not required, the purchaser selects each item of the detailed purchasing condition input sheet according to the purchase propensity.

In the detailed purchasing condition input sheet shown in FIG. 12C, a color is beige among four colors, a brightness is bright, a chroma is light, a pattern is no between two patterns, and a shape of a neck is V-shape, in the contents of the products information of FIG. 12B. By way of provisions against an occasion that the purchaser does not know how it inputs due to the insufficiency of preliminary information on the product to be purchased by the purchaser, it makes the product selection easier, and it is possible to shorten the time required for inputting various purchasing conditions.

If the input of the detailed purchasing condition is completed and a confirming button is pushed, the products satisfaction index and the purchasing satisfaction condition are computed, and the product retrieve is performed. In order to modify the inputted contents, a modify button is pushed, and the cancel button is pushed to cancel the inputted contents.

FIGS. 12A and 12C show one embodiment of the present invention, in which a purchaser having an ID called kkkk inputs the purchasing condition to retrieve a men's shirt in a range of 40,000 won to 60,000 won. The contents of the basic and detailed input sheets in FIGS. 12A and 12C are substantially similar to those of the request of products information registration of FIG. 11A.

In case of selecting and inputting the particulars for each item of the request of products information registration, and the basic and detailed purchasing condition input sheets, in FIG. 11A, FIGS. 12A and 12C, the input is performed by a radio button input manner selecting one by pushing a button ⊙, a check input manner marking a symbol ✓ in case of simultaneously selecting and inputting two or more particulars, or a number input manner appointing numbers to the particulars and selecting a corresponding content by the seller or the purchaser in case of inputting the purchasing condition requiring the weight or order.

If the input is completed, the products information system extracts the products suitable for the product name and price condition, which are the first retrieve condition, and computes the products satisfaction index and the purchasing satisfaction condition of the group of the products. In particular, the purchaser having an ID called kkkk selects a "quality" item among the product selection criteria items. The purchasing conditions related to the quality includes "price", "origin", "product material", "wrinkle-free", and "sweat absorption", in case of the shirt, as can be seen from a classification table of purchasing conditions related to the products selection criteria items of FIG. 13. It will be seen that the items of "price", "origin", "wrinkle-free", and "sweat absorption" are identical to the items of "price", "origin", "wrinkle-free", and "sweat absorption" in the request of products information registration of the seller in FIG. 11A, with the comparative item being the quality in each other. It will be seen that the "product material" is different from each other, for example, mixed spinning and cotton. When the operator makes the purchasing condition database, the classification table related to the whole products is prepared as an example of FIG. 13, and is applied when computing the products satisfaction index based on the weight.

The products satisfaction index may be computed by use of the weight applying method of the equation 3 as below to identify how a product model C5896 satisfies the purchasing condition of the purchaser.

In the products satisfaction index $Is=\{(xNcs+Nct)/(xNs+(Nt-Ns))\}\times 100$, the total purchasing condition items of the purchaser, Nt, is 32 items among the purchasing conditions of the purchaser, except a product user and the product selection criteria. Whether the product user is the person himself or herself is not important to compute the products satisfaction index. Since the item of product selection criteria is used to apply the weight, the above two items are excluded from the total of items.

The number of purchasing condition items, Ns, related to the "predominant item" of the products information database and the "product selection criteria" items among the purchasing condition items includes five items such as "price", "origin", "product material", "wrinkle-free", and "sweat absorption". The number of the purchasing conditions, Ncs, in case that the contents of "predominant item" of the products information database is identical to that of the item of "product selection criteria" among the purchasing condition items includes four items such as "price", "origin", "wrinkle-free", and "sweat absorption". The number of the purchasing condition items, Nct, in case that the contents of "predominant item" of the products information database is not identical to that of the item of "product selection criteria" among the purchasing condition items includes 26 items except whether to have a pocket or not. The weight, x, on each item of which the contents is identical between the number of purchasing condition items related to the "predominant item" of the products information database and the "product selection criteria" items among the purchasing condition items is applied twice as much as the common item. It is determined by the operator, and a deviation of the products satisfaction index is increased by raising the weight for the product similar to the characteristic or property of the product or the purchasing condition, thereby making the product retrieve to be easy.

Computing the products satisfaction index based on the weight applying method, in $Is=\{(xNcs+Nct)/(xNs+(Nt-Ns))\}\times 100$, $Is=\{((2\times 4)+26)/(2\times 5)+(32-5)\}\times 100 \approx 91.9(\%)$. Accordingly, the product model C5896 is 91.9% of Is, and thus satisfies to the purchasing condition of the purchaser having the ID of kkkk.

Computing the products dissatisfaction index using the equation 4, since it is represented as the results by subtracting the products satisfaction index (Is) from 100 of the maximum products satisfaction index, $Iu=(Nu/Nt)\times 100=100-Is=100-91.9 \approx 8.1(\%)$. The product having about 8.1% of Iu does not satisfy to the products satisfaction index of the purchaser.

Next, computing the purchasing satisfaction condition using the equation 5, since in $Psp=Ps\times Is$, the selling price (Ps) of individual product is 53,000 won, and the products satisfaction index (Is) is 91.9%, $Psp=53,000\times 91.9\% \approx 48,700$ won. In addition, computing the purchasing satisfaction condition based on the products dissatisfaction index, since the reduced price (Pr) is a price computed by multiplying 53,000 won of the selling price (Ps) by 8.1% of the products dissatisfaction index (Iu), $Pr=Ps\times Iu/100=53,000\times 8.1\% \approx 4,300$ won. Accordingly, since the purchasing satisfaction condition is a price computed by reducing the selling price by a part corresponding to the dissatisfaction of the purchaser to the product, $Psp=Ps-Pr=53,000-4,300=48,700$ won.

If the first product retrieve is completed and the products satisfaction index and the purchasing satisfaction condition are determined, the final product retrieve is performed in the retrieving items.

If a retrieve button 22 for the products satisfaction index is clicked, a message to input a value on a value inputting blank 23 of the products satisfaction index is displayed. If the purchaser inputs a value of the products satisfaction index to be retrieved and pushes the retrieve button, the products which belong to a range of the products satisfaction index more than the value are arranged and displayed. If necessary, the purchaser may modify and retrieve the value of the products satisfaction index at any time.

Figure 14A:
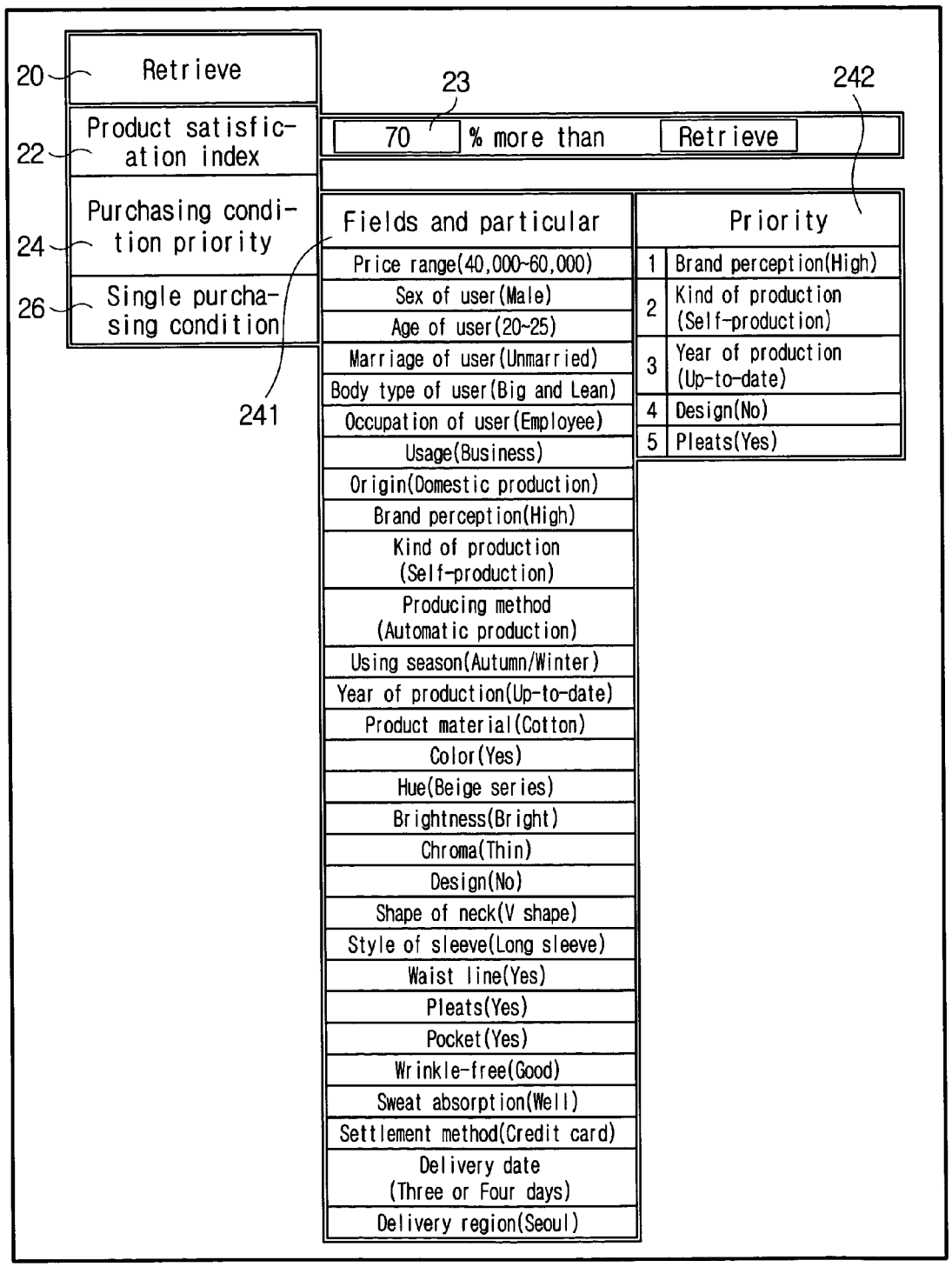
FIG. 14A shows a sub-menu provided in case of selecting a retrieved item in FIG. 10.

The purchaser clicks a retrieve button 24 for the priority of the purchasing conditions, items of the purchasing condition input sheet prepared by inputting the purchasing conditions with the purchaser and the contents 241 the particulars selected to the item are displayed. The purchaser drags and fills in order the items determined in accordance with the priority. Alternatively, the purchaser may provide the items of the purchasing condition input sheet with serial numbers, and inputs in order the corresponding number of the item in the input blank 242 in accordance with the priority. FIG. 14A shows the priority of the purchasing condition determined and inputted by the purchaser kkkk, in which five priorities are inputted in the embodiment of the present invention, but may be modified depending upon the kind or characteristic of the product and the environment of the operator. If the priorities are inputted, the products are rearranged depending upon the order of the priorities, so that the purchaser can retrieve accurately the required target product.

Figure 14B:
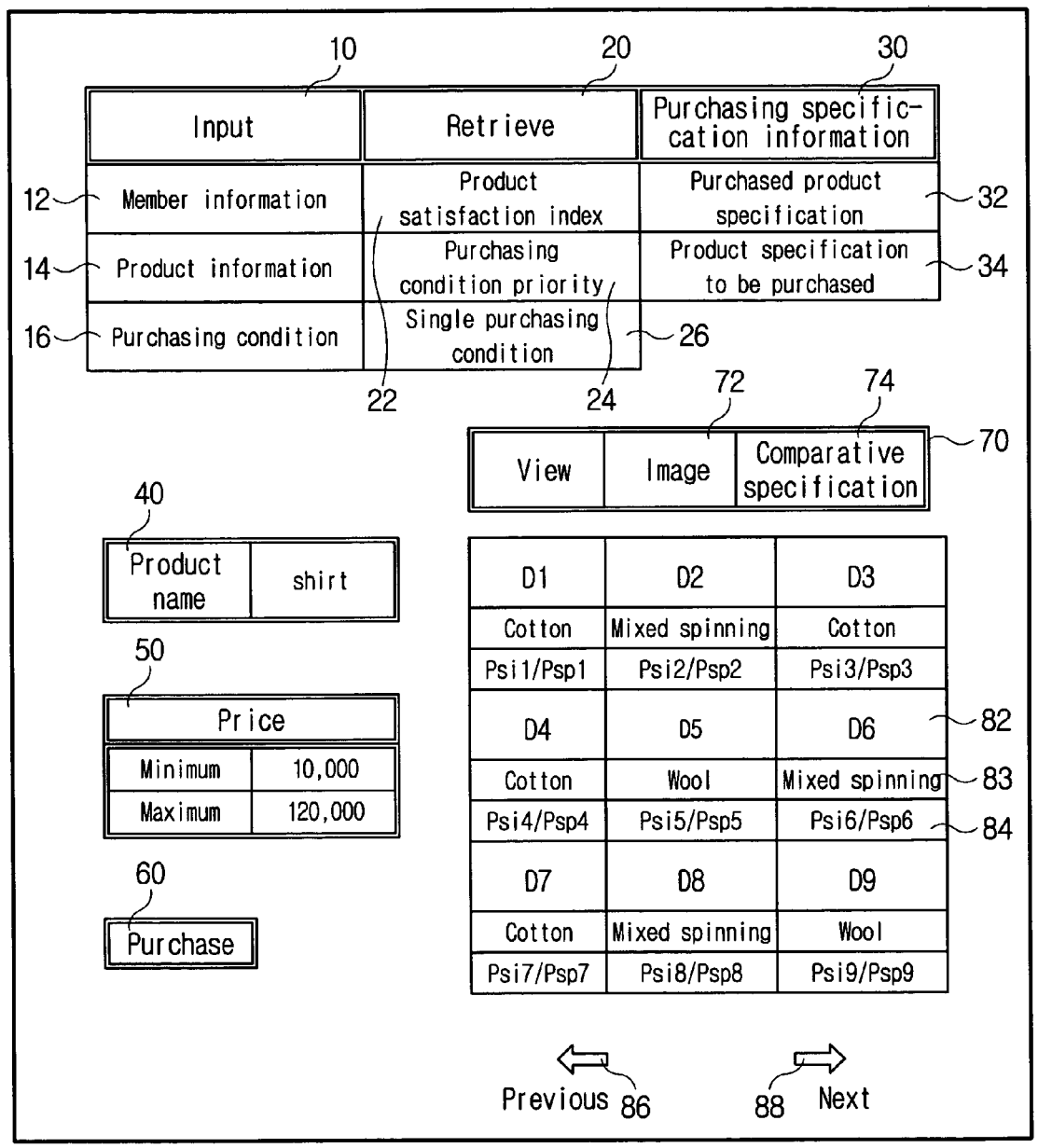
FIG. 14B shows an example of a retrieved result displayed on a screen when inputting a single purchasing condition in FIG. 10.

If the purchaser clicks the retrieve button 26 for a single purchasing condition, items of the purchasing condition input sheet prepared by inputting the purchasing conditions with the purchaser and the contents 242 the particulars selected to the item are displayed. If the purchaser selects one among the items, the contents is displayed on the screen. For one example, if the "product material" item is selected in FIG. 14A, the contents 83 related to the product material of each product is displayed on the screen as shown in FIG. 14B. Thus, the purchaser can compare the products in accordance with each purchasing condition. Alternatively, the system may retrieve the products in various manners based on the retrieving criteria such as products dissatisfaction index and selling price, as well as retrieving the product based on the priority of the purchasing conditions or products satisfaction index. Since the operator process the products information in accordance with various purchasing conditions of the purchaser, the operator can provide the seller with various marketing related information such as a sex, an age group, a propensity to purchase and so forth.

Referring to FIG. 10, the product name among the purchasing conditions inputted by the purchaser is displayed in a product name item 40, and the minimum price condition and the maximum price condition among the purchasing conditions inputted by the purchaser are displayed in a price item 50.

A view item 70 includes an image view button 72 and a comparative specification view item 74. If is used by the purchaser to view the retrieved results using the screen consisting of a product image and the products satisfaction index or the screen consisting of the comparative specification. For one example, if the image view button 72 is clicked, the product image or moving picture 82 is displayed as a checked-arranging screen 80, together with the products satisfaction index (PSI) and the purchasing satisfaction condition (PSP) 84. Nine screens from D1 to D9 are provided in FIG. 10, but the number of the screens may be regulated depending upon the environment of the operator. Such the checked-arranging screen has some advantages in that the purchaser can compare the group of retrieved product together with the products satisfaction index, and can easily find the target product by considering the products in order of magnitude of the products satisfaction index. The checked-arrangement can provide several effects in that the operation of various games using the product screen may arouse an interest in the purchaser, and the sales effect may be increased by offering premiums. Under the checked-arranging screen, there are a previous page shift arrow 86 and a next page shift arrow 88 so as to easily shift the page.

If the comparative specification view button 74 is clicked, the retrieve results are displayed as the comparative specification on the basis of the products satisfaction index, and the checked-arranging screen disappears. Again click the image view button 72, and the checked-arrangement reappears. However high the products satisfaction index, there will be a case in which it does not satisfy the purchasing condition to be considered by the purchaser himself/herself. At that time, by previously considering dissatisfaction factors of the product having the high products satisfaction index in the comparative specification, the target production may be more accurately found when determining the priority of the purchasing condition items.

The product retrieve results of the purchaser are shown as a comparative specification in FIG. 15A, in which only products having above 70% of the products satisfaction index inputted by purchaser himself/herself in FIG. 14A are displayed, and it is shown in that the products satisfaction index of the product model A3589 is 93.7%. In the embodiment of the present invention, the purchaser kkkk inputs in the input blank 242 items among several purchasing conditions as shown in FIG. 14A in the order of priority, for example, a product having high brand perception at the first priority, a self-supplied product at the second priority, an up-to-date product at the third priority, a product having no design at fourth priority, and a product having no winkle at the fifth priority. Since the product model A3589 does not coincide with the product required by the purchaser kkkk who considers the brand perception as the first priority, it does not regard it as the target product. As would be seen from the comparative specification arranged based on the priorities of the purchasing condition in FIG. 15B, the product C5896 having 91.9% of the products satisfaction index is appropriate to the purchaser kkkk. Accordingly, the utilization of the product dissatisfaction factor of the comparative specification and the priorities of the purchasing conditions may cause target product to be most exactly found. Of course, upon making a decision over the purchase, since the purchasing conditions of the purchaser are always changed, the product model No. A3589 may be appropriate to the purchaser kkkk.

The electric commerce is achieved after the products information retrieve is completed. Specifically, if the purchaser moves the cursor onto the screen of the product to be purchased among the retrieved products, and pushes a purchase button 60. The purchase approval module determines whether the purchasing satisfaction condition of the selected product belongs to the range of the sale approval price of the seller, and displays the results of the purchase approval on the screen.

For example, when the purchaser kkkk purchases the product C5896 having 91.9% of the products satisfaction index, 48,700 won of the purchasing satisfaction condition of the product is a purchase offering price, while the sale approval price according to the products satisfaction index of the products information database belongs to a range from 50,615 won to 53,000 won. The product is not obtained permission to be automatically purchased for 48,700 won. If the purchaser wants to purchase the product, since the products satisfaction index is 91.9% as shown in FIG. 11B, the selling price of 50,615 won (the minimum sale approval price for 91 to 95% of the products satisfaction index) which is reduced the price by 4.5% is displayed from the products information database. At that time, if the purchaser regards the price as a proper price, the purchaser may purchase it. 48,700 won which is the purchase proposal price by the purchaser and 50,615 won which is the final sales proposal price of the seller are a chaffering price. If the purchaser makes a decision over the purchase, the product is transferred to the purchaser, while the seller has an order to deliver the product to the purchaser.

FIG. 16 shows a multiple retrieving method according to the present invention.

If a product set 90 consists of a shirt and a tie, there are three cases: first, the purchaser is satisfied with the shirt, but wants to select another tie; secondly, how does the tie satisfy the purchasing condition of the purchaser, in other words, the purchaser wants to know the products satisfaction index; and, finally, the purchaser wants to further retrieve another tie on the basis of the corresponding tie, for example, whether there is other tie that is better.

In the prior case, however, after the purchaser decides to purchase the shirt, the purchaser again retrieves and selects another tie from the beginning. According to the present invention, the purchaser can retrieve another tie, without the shirt product. Specifically, in state of selecting the shirt, if a product name 94 called tie is clicked, the contents of the inherent products information on the basic purchasing condition and the detailed purchasing condition for the tie, i.e., the basic purchasing condition input sheet and the detailed purchasing condition input sheet each supplied with an initial value, are provided. At that time, the purchaser selects and inputs the condition suitable for the items with no given value to each purchasing condition item. And then, if the purchaser revises and inputs items suitable for the purchasing condition of his/her, the products satisfaction index and the purchasing satisfaction condition are computed, and other similar retrieved products suitable to the condition are displayed. At that time, the purchaser may select other similar retrieved products suitable to his/her taste on the basis of the image of the shirt.

The routine of selecting the shirt and then the tie matching with the shirt through the above processes may be easily performed by multitasking.

This is possible because when inputting the information of the product set of the seller, the product name and the price range are separately classified by the kind of products and are stored in the products information database, and because only the products closest to the purchasing condition of the purchaser are displayed on the basis of the value called the products satisfaction index.

Referring to FIG. 17, in case that a button 32 for referring the products specification purchased or a button 34 for referring the products specification to be purchased is clicked on the initial screen, a table 321 containing much information is displayed. The button 32 for referring the products specification purchased is used to review the products specification previously purchased to again purchase it, and the button 34 for referring the products specification to be purchased is used to review the information newly replaced by the updated data by reading in the products specifications which were not purchased in the past and are stored in the temporary keeping box. At that time, if one product is selected among the products displayed, the information related to the product is displayed.

The present invention constructed as described above has some advantages.

First, since the purchaser retrieves the product by use of only one value called the products satisfaction index, it is possible to find the target product easily, quickly and correctly. In particular, the products satisfaction index becomes substantial information because of reflecting simultaneously the comparative dominant item to the product to be sold by the seller and the products selection criteria item of the purchaser.

In addition, the more effective product retrieve may be performed by showing the product dissatisfaction factors in the comparative specification, and the target product can be correctly retrieved on the basis of various purchasing conditions for the group of the retrieve products.

The product purchase may be easily performed since the related products are retrieved through the multiple retrieve.

Furthermore, the purchase satisfaction can be obtained due to the purchasing satisfaction condition computed based on the products satisfaction index, and since the products dissatisfaction index is converted into the reduced price the purchaser can obtain the purchase satisfaction.

Since the purchasing satisfaction condition and the sale approval price are automatically changed, the seller can be absolutely relieved of the burden of price competition with the products manufactured by other company. By the utilization of the minimum sale approval price based on the products satisfaction index, a latent purchasing client can be directly connected to the purchase. In particular, since the purchaser can retrieve extensive products, it is easy to sell the related products in addition to the product to be retrieved by the purchaser. Also, because various purchasing conditions of the purchaser are applied to the product, it can easily set up a marketing plan, and it can reduce various expenses. Sales are promoted by compensating the products dissatisfaction index of the purchaser with the reduced price.

The number of members is increased by providing the purchaser with the convenient retrieving method, and accordingly, the increase of the advertising revenue and effective marketing are possible. Since it is easy to sell the related products through the multiple retrieve, the value of the sale is increased. In addition, the product retrieve is directly connected to the purchase through the products satisfaction index and the purchasing satisfaction condition. An intermediary profit may be increased by the sales promotion because of carrying out the electric commerce in real time. Furthermore, since various purchasing conditions of the purchaser are applied to the sales product of the seller, statistical data and information usable in the object economy may be provided to the manufactures, the producers, the distributors and other companies starting a new business.

The invention claimed is:

1. An electronic commerce method employing a products satisfaction index, the method comprising the steps of:
receiving sales products information from a seller, and storing the products information in a products information database;
receiving a product name and a price condition from a purchaser who joins as a member, and first retrieving products for purchasing by the purchaser;
receiving at least two purchasing conditions of the first retrieved products from the purchaser, secondly retrieving products for purchasing from the first retrieved products, and comparing the products information obtained from the seller with the purchasing conditions, to compute products satisfaction indexes of the secondly retrieved respective products and purchase satisfaction prices from the products satisfaction indexes;
receiving desired values of the products satisfaction indexes from the purchaser, and thirdly retrieving products for purchasing from the secondly retrieved products;
finally retrieving products for purchasing from the thirdly retrieved products depending on a priority of the purchasing conditions determined by the purchaser; and
comparing the computed purchase satisfaction prices of the finally retrieved products with a minimum sale approval price of the seller, to approve the purchase.

2. The electronic commerce method as claimed in claim 1, wherein the sales products information is received from the seller via a request for products information registration with input guide information generated from a purchasing condition database.

3. The electronic commerce method as claimed in claim 1, wherein the at least two purchasing conditions of the first retrieved products are received from the purchaser via a purchasing condition input sheet with input guide information generated from a purchasing condition database.

4. The electronic commerce method as claimed in claim 1, wherein the products satisfaction indexes are computed in accordance with a below equation:

$$Is=(Nc/Nt)\times 100$$

wherein, Is is the respective products satisfaction index, Nc is the number of the respective purchasing condition items identical to corresponding fields of the products information database, and Nt is the total purchasing condition items of the purchaser.

5. The electronic commerce method as claimed in claim 1, wherein the products satisfaction indexes are computed in accordance with a below equation:

$$Is=\{(xNcs+Nct)/(xNs+(Nt-Ns))\}\times 100$$

wherein, Is is the respective products satisfaction index, Ncs is the number of the purchasing conditions in that contents of "predominant items" in the products information database are identical to that of corresponding "product selection criteria" among purchasing condition items, Nct is the number of the purchasing condition items in that the content of "predominant items" in the products information database are not identical to that of corresponding "product selection criteria" among the purchasing condition items, Ns is the number of purchasing condition items corresponding to the "predominant items" in the products information database and the "product selection criteria" items among the purchasing condition items, Nt is the total purchasing condition items of the purchaser, and x is a weight on each item of which the contents is identical between the "predominant items" in the products information database and that of the corresponding "product selection criteria" among the purchasing condition items.

6. The electronic commerce method as claimed in claim 1, wherein the purchase satisfaction price is computed in accordance with a below equation:

$$Psp=Ps\times Is$$

wherein, Psp is the purchasing satisfaction price, Ps is a selling price of individual product, and Is is the products satisfaction index.

7. The electronic commerce method as claimed in claim 1, wherein the purchase satisfaction price is computed in accordance with a below equation:

$$Psp=Ps-Pr=Ps-\{Ps\times(100-Is)\}/100=Ps-(Ps\times Iu)/100$$

wherein, Psp is the purchasing satisfaction price, Ps is a selling price of individual product, Pr is a reduced price, Is is the products satisfaction index, and Iu is a products dissatisfaction index.

8. The electronic commerce method as claimed in claim 1, wherein a comparative specification indicative of the information on the corresponding products is provided in at least one of said retrieving steps.

9. The electronic commerce method as claimed in claim 1, wherein in case of a product set in which the finally retrieved product can be combined with associate products, a purchasing condition input sheet is provided for retrieving the associate products through a multitasking while the finally retrieved product is displayed, and products satisfaction indexes and purchase satisfaction prices for the associate products are computed for aiding the purchaser in further purchasing the associate products.

10. The electronic commerce method as claimed in claim 1, wherein after the first retrieve, a detailed purchasing condition input sheet with basic establishing information regarding to the purchasing conditions is provided to the purchaser for said receiving at least two purchasing conditions.

11. An electronic commerce system, having a plurality of purchaser clients and a plurality of seller clients connected to an electronic commerce server via a network, the system comprising:
a purchasing condition database for storing purchasing condition information obtained from the purchaser clients;
a products information database for storing products information obtained from the seller clients;
a products information input module for enabling the seller clients to input the products information according to a format provided through the product information database;
a purchasing condition input module for enabling the purchaser clients to input purchasing conditions of products for purchasing according to a format provided through the purchasing condition database;
a products satisfaction index computing module for comparing the products information stored in the products information database with the purchasing conditions inputted by the purchaser clients to compute a products satisfaction index of each product for purchasing;
a purchasing satisfaction price computing module for computing a purchasing satisfaction price utilizing the computed products satisfaction index;
a retrieve module for first retrieving target products corresponding to at least one information provided from a purchaser client, the information selected from a group consisting of a product name and a price condition, for secondly retrieving target products corresponding to a plurality of purchasing conditions provided from the purchaser client, for thirdly retrieving target products corresponding to the products satisfaction index, and for finally retrieving target products corresponding to a priority of the purchasing conditions; and
a control module for controlling operation of the modules and storage and output of data from the databases.

12. The electronic commerce system as claimed in claim 11, further comprising a purchase approval module for determining whether the purchasing satisfaction price of the target products finally selected by the purchaser client is within a range of a sale approval price of the seller clients, displaying a result of the determination on a screen, and storing purchasing details in the electronic commerce server.

13. An electronic commerce method for transacting sale of products through a computer network, the method comprising:
storing sales products information obtained from a seller in a products information database;
receiving at least one of a product name and a price condition from a purchaser;
retrieving target products for purchasing corresponding to the at least one of a product name and a price condition;
receiving a plurality of purchasing conditions of the retrieved target products from the purchaser;
comparing the products information stored in the products information database with the purchasing conditions;
computing products satisfaction indexes of the retrieved target products, and purchase satisfaction prices corresponding to the products satisfaction indexes of the products;
obtaining minimum sale approval prices of the products from the seller;
retrieving target products for purchasing rearranged or indexed according to at least one of the computed products satisfaction indexes and the purchase satisfaction prices;
comparing the computed purchase satisfaction prices of the products finally selected by the purchaser with the minimum sale approval prices of the seller; and
approving purchasing of the selected products when the computed purchase satisfaction prices are not less than the minimum sale approval prices of the products.

14. The electronic commerce method as claimed in claim 13, further comprising receiving desired values of the products satisfaction indexes from the purchaser, performed prior to said comparing the computed purchase satisfaction prices of the finally selected products with the minimum sale approval prices of the seller in order to facilitate final selection of the purchaser.

15. The electronic commerce method as claimed in claim 13, further comprising retrieving target products for purchasing according to a priority of the purchasing conditions determined by the purchaser, performed prior to said comparing the computed purchase satisfaction prices of the finally selected products with the minimum sale approval prices of the seller in order to facilitate final selection of the purchaser.

16. The electronic commerce method as claimed in claim 13, wherein said obtaining minimum sale approval prices are performed by the seller utilizing the products satisfaction indexes of the products.

* * * * *